United States Patent
Sakamoto et al.

(10) Patent No.: US 8,919,197 B2
(45) Date of Patent: Dec. 30, 2014

(54) BANK ANGLE DETECTING DEVICE FOR VEHICLE

(75) Inventors: Takuya Sakamoto, Akashi (JP); Yoshiteru Harada, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 389 days.

(21) Appl. No.: 13/211,179

(22) Filed: Aug. 16, 2011

(65) Prior Publication Data
US 2012/0067122 A1    Mar. 22, 2012

(30) Foreign Application Priority Data

Sep. 22, 2010  (JP) ................................ 2010-212826

(51) Int. Cl.
| | |
|---|---|
| G01P 3/00 | (2006.01) |
| B60W 40/112 | (2012.01) |
| B60Q 1/12 | (2006.01) |
| B60W 40/103 | (2012.01) |
| B60W 40/114 | (2012.01) |
| B62J 6/02 | (2006.01) |

(52) U.S. Cl.
CPC ............... *B60W 40/112* (2013.01); *B60Q 1/12* (2013.01); *B60W 40/103* (2013.01); *B60W 40/114* (2013.01); *B62J 6/02* (2013.01); *B60Q 2300/112* (2013.01); *B60Q 2300/134* (2013.01); *B60Q 2300/136* (2013.01); *B60W 2300/36* (2013.01); *B60W 2520/10* (2013.01); *B60W 2520/14* (2013.01); *B60W 2520/18* (2013.01); *B60Y 2200/12* (2013.01); *B62K 2207/02* (2013.01)
USPC ............................................ 73/493; 73/488

(58) Field of Classification Search
CPC ..... B60Q 1/12; B60W 40/112; B60W 40/114
USPC ..................................................... 73/488, 493
See application file for complete search history.

(56) References Cited

U.S. PATENT DOCUMENTS

| | | | |
|---|---|---|---|
| 7,814,793 B2 | 10/2010 | Sato | |
| 2008/0037296 A1* | 2/2008 | Hsu et al. | ........................ 363/41 |

(Continued)

FOREIGN PATENT DOCUMENTS

| | | |
|---|---|---|
| JP | 04-151563 | 5/1992 |
| JP | 08-268257 | 10/1996 |

(Continued)

OTHER PUBLICATIONS

Japanese Application No. 2010-212826 Office Action dated Mar. 4, 2014, 4 pages with partial English translation.

(Continued)

*Primary Examiner* — Hezron E Williams
*Assistant Examiner* — Gregory J Redmann

(57) ABSTRACT

A bank angle detecting device includes an angular velocity sensor for detecting a roll rate and a yaw rate of the vehicle, a roll rate estimating circuit for calculating an estimated roll rate, which is an angular velocity about a forward and rearward axis, on the basis of the roll rate, the yaw rate and a travelling speed, a bank angle estimator for calculating an estimated bank angle from the estimated roll rate, a straightforward travel determiner for determining a straightforward travelling condition on the basis of the estimated roll rate and an estimated yaw rate, a time-of-straight-forward-travel drift amount estimator for estimating a time-of-straight-forward drift amount from an output of the angular sensor in the event that the straightforward travel determiner determines a straightforward travel, and an angular velocity corrector for correcting the output of the angular velocity sensor with the time-of-straight-forward drift amount.

12 Claims, 12 Drawing Sheets

(56) References Cited

U.S. PATENT DOCUMENTS

2008/0112174 A1* 5/2008 Nakano et al. ............... 362/466
2008/0184770 A1 8/2008 Sato

FOREIGN PATENT DOCUMENTS

| | | |
|---|---|---|
| JP | 10-324191 | 8/1998 |
| JP | 2004-155404 | 6/2004 |
| JP | 2006-151239 | 6/2006 |
| JP | 2008-151681 | 7/2008 |
| JP | 2008-190980 | 8/2008 |
| WO | 2007/013216 | 2/2007 |

OTHER PUBLICATIONS

Japanese Application No. 2010-212826 Office Action dated Sep. 30, 2014, 4 pages with partial English translation.

* cited by examiner

PRIOR ART

BANK ANGLE DETECTING DEVICE FOR VEHICLE

CROSS REFERENCE TO THE RELATED APPLICATION

This application is based on and claims Convention priority to Japanese patent application No. 2010-212826, filed Sep. 22, 2010, the entire disclosure of which is herein incorporated by reference as a part of this application.

BACKGROUND OF THE INVENTION

1. Field of the Invention

The present invention relates to a bank angle detecting device for a vehicle such as, for example, a motorcycle or a small sized planing boat, which device can accurately detect the vehicle bank angle during the cornering of the vehicle.

2. Description of the Related Art

When a motorcycle then travelling on the road surface approaches a corner, the rider undergoes a cornering with the motorcycle banked at a certain angle. The standard motorcycle currently commercially available in the market has a headlamp fixed to the motorcycle frame structure and, therefore, when the motorcycle is banked, the optical axis of the headlamp tilts in concomitance with the tilt or banking of the motorcycle. Thus, rays of light projected from the headlight towards a zone forwardly of the motor cycle and conforming to the eyesight of the rider during the cornering in the night tend to be reduced, resulting in narrowing the field of view forwardly of the travelling direction of the motorcycle.

In other words, as shown in FIG. 14 illustrating the forward sight as viewed by the motorcycle rider, when and so long as the motorcycle travels straightforward, the region of illumination (light distribution) A cast by the headlamp represents a region spreading leftwards and rightwards in a direction parallel to the horizontal line H, and in contrast, when the motorcycle turns in a leftward direction, shown by the arrow P, along a curved lane 90 as shown in, for example, FIG. 15 and does hence undergo a cornering with the body of the motorcycle banked leftwards, the region of illumination A cast by the headlamp tilts downwardly leftwards as compared with that assumed during the straight forward travel. As a result, the region of illumination A of the headlamp is reduced at an area encompassed within the forward sight of the motorcycle rider and positioned inwardly of the direction of turn (as indicated by a portion B enclosed within the phantom circle in FIG. 15), that is, forwards with respect to the direction of travel of the motorcycle then undergoing the cornering and, as a matter of fact, the rider's field of view forwardly of the direction of cornering is narrowed.

As a headlamp device designed to solve those problems discussed above, the JP Laid-open Patent Publication No. 2004-155404 discloses the headlight device in which based on the bank angle of the motorcycle body detected by a bank angle detector, a lens and a light emitting element of the headlamp are rotated in a direction reverse to the direction in which the motorcycle body is banked.

According to the headlamp device disclosed in the above mentioned patent publication, a yaw rate sensor such as a gyro is employed as the bank angle detector and the bank angle δ can be given by the following formula:

$$\delta = \sin^{-1}(v \cdot R/g) \quad (1)$$

wherein v represents the motorcycle speed, g represents the gravitational acceleration and R represents the yaw rate.

Thus, the headlamp is rotated an angle, corresponding to the bank angle δ so determined, in a direction reverse to the bank angle δ to secure the region of illumination of the headlamp that provides a large field of view.

However, the value R of the yaw rate sensor, employed in the above formula (1), is the sum of the actual yaw rate value plus the amount of sensor drift. The sensor drift amount referred to above is the sum of a zero point error, generated due to electric characteristic at the time the electric power is turned on, and the amount of time dependent change of the zero point due to an external factor such as, for example, change in temperature. If the sensor drift amount is zero, the bank angle δ of the motorcycle can be accurately calculated by means of the above formula (1). However, since the sensor drift amount is in practice not zero, under the influence of such a sensor drift the bank angle δ involves a probable error. This probable error is generally proportional to the motorcycle speed and the sensor drift amount and, therefore, particularly where the motorcycle speed is high, the probable error brought about by the sensor drift amount becomes large.

SUMMARY OF THE INVENTION

The present invention has been devised to substantially eliminate the foregoing problems and inconveniences and is intended to provide a bank angle detecting device for a vehicle, in which the sensor drift amount is accurately removed to increase the estimated accuracy of the bank angle.

In order to accomplish the foregoing object of the present invention, there is provided a bank angle detecting device for a mounting type vehicle which includes an angular velocity sensor for acquiring a detection value containing respective component of a roll rate, which is an angular velocity about a forward and rearward axis of the vehicle, and a yaw rate, which is an angular velocity about a vertical axis of the vehicle; a roll rate estimator for calculating an estimated roll rate on the basis of the detection value of the angular velocity and a travelling speed of the vehicle; a bank angle estimator for calculating an estimated bank angle of the vehicle from the estimated roll rate; a straight forward travel determiner for determining a straight forward travelling condition of the vehicle during the travel of the vehicle on the basis of the estimated roll rate and a value associated with the estimated bank angle; a time-of-straight-forward-travel drift amount estimator for estimating a sensor drift amount during the straight forward travel of the vehicle from an output of the angular velocity sensor in the event that the straight forward travel determiner determines the straight forward travelling condition; and an angular velocity corrector for correcting the output of the angular velocity sensor with the sensor drift amount estimated by the time-of-straight-forward-travel drift amount estimator.

It is to be noted that the term "value associated with an/the estimated bank angle" referred to hereinabove and hereinafter is to be construed as encompassing the estimated bank angle and an estimated yaw rate calculated from the estimated bank angle and the travelling speed.

According to the above described construction, based on the estimated roll rate and the value associated with the estimated bank angle such as, for example, the estimated yaw rate or the estimated bank angle, the straight forward travelling condition of the vehicle is determined. In other words, the presence or absence of a slalom travel is determined from the estimated roll rate and the magnitude of radius of turn is determined from the estimated yaw rate or the estimated bank angle. Accordingly, the straight forward travelling condition or the travelling condition, in which the radius of turn is large enough to consider that the vehicle is travelling straight forward can be precisely determined. In addition, since the sensor drift amount during the straight forward travel is estimated from the output of the angular velocity sensor and the output of the angular velocity sensor is then corrected with the estimated sensor drifted amount, the sensor drift amount during the travel of the vehicle can be accurately calculated and removed with a simplified structure, resulting in an increase of the estimated accuracy of the bank angle. In particular, when the angular velocity corrector removes the drift amount from the output of the angular velocity sensor, a value approximate to the real angular velocity can be obtained with influences of the drift amount having been removed. Since, in place of the output value of the angular velocity sensor, the bank angle is estimated based on a correction value from which the influences of the drift amount have been removed, the accuracy of estimation can be increased.

In the present invention, the angular velocity sensor is preferably so arranged as to incline at a predetermined angle of inclination about a leftward and rightward axis relative to the forward and rearward axis of the vehicle. According to this construction, calculation of the bank angle and removal of the sensor drift can be accomplished with the use of only one angular velocity sensor and, therefore, the structure can be further simplified.

Also, the straight forward travel determiner may be of a type which determines the straight forward travelling condition in the event that a condition, in which the estimated roll rate is lower than a first predetermined determination value, continues for a first predetermined length of time and, also, a condition, in which the value associated with the estimated bank angle is lower than a second predetermined determination value, continues for a second predetermined length of time. According to this construction, the vehicle can be determined as not in a slalom condition if the condition, in which the estimated roll rate is lower than the first determination value, continues for the first predetermined length of time. Also, the vehicle can be determined as in a straight forward travelling condition or in a condition travelling at a large radius of turn enough to recognize as the straight forward travelling condition, in the event that the condition, in which the value associated with the estimated bank angle, for example, the estimated yaw rate or the estimated bank angle is lower than the second determination value, continues for the second predetermined length of time. Also, if the first and second determination values and the first and second predetermined lengths of time are properly chosen and set, the straight forward travelling condition can be determined precisely.

In the present invention, the angular velocity corrector may preferably include a suppressing circuit for suppressing a change in amount of correction. According to this construction, since an abrupt change of the bank angle can be suppressed by the suppressing circuit, it is possible to avoid the possibility that as a result of an abrupt change of, for example, a lamp illuminating surface caused by the abrupt change in bank angle, the driver may feel discomfort.

In the present invention, the bank angle detecting device may further include a process suspending circuit operable to suspend the calculation of the drift amount during the straight forward travel, which is performed by the time-of-straight-forward-travel drift amount estimator, in the event that subsequent to determination of the straight forward travelling condition the estimated roll rate and the value associated with the estimated bank angle exceed respective predetermined values, but to resume such calculation in the event that they attain respective values lower than the predetermined values.

According to this construction, even when the vehicle is determine to deviate temporarily from a straight forward travel determining condition as a result of the vehicle body undergoing vibration due to the wind or a road surface condition during the straight forward travel, the calculation of the drift amount during the straight forward travel can continue once the vehicle is determined to subsequently resume the straight forward travelling condition, and, therefore, cases of the calculation being incapable, which would occur when the motorcycle rider intentionally rock the vehicle body considerably can be reduced, allowing the calculation to be performed assuredly.

Where the process suspending circuit is employed, the use is preferred of a reset circuit operable to invalidate a calculation of the drift amount during the straight forward travel, which is performed by the time-of-straight-forward-travel drift amount estimator, in the event that such calculation fails to terminate within a predetermined length of time subsequent to the determination of the straight forward travelling condition. According to this construction, in the event that the calculation is protracted because, for example, change in output of the angular velocity sensor is considerable, invalidation of such calculation is effective to avoid a prevention of an erroneous estimation of the drift amount during an instable condition and an useless continuance of the calculation.

In the present invention, the bank angle detecting device may further include a standstill determiner for determining a standstill condition of the vehicle and a standstill time drift amount estimator for estimating a sensor drift amount from an output of the angular velocity sensor in the event that the standstill time determiner determines the standstill condition, in which case the angular velocity corrector corrects the output of the angular velocity sensor with the sensor drift amount estimated during the standstill condition. According to this construction, in addition to the straight forward travel, the sensor drift occurring during the halt of the vehicle can also be removed.

In the present invention, the estimated roll rate inputted to the standstill determiner is preferred to be the one from which a change in frequency lower than a predetermined frequency is removed. Although the roll rate stays at zero during the standstill condition, it changes when a rider rides on the vehicle and when a rider rocks the vehicle body while straddling the vehicle. On the other hand, the sensor drift amount during the standstill condition may be regarded as a constant value when considering at intervals of a time in units of a few tens seconds. Even if the roll rate changes because of an external factor such as, for example, a change in temperature, the speed of such change is sufficiently low compared with the change of the roll rate brought about movement of a man. According to this construction, since the low frequency change such as, for example, the sensor drift amount is removed, a man-caused maneuver during the standstill condition can be definitely detected, making it possible to determine the standstill condition accurately.

A bank angle detecting method, to which the present invention also pertain, includes a detecting step of acquiring a detection value containing roll rate and yaw rate components of the vehicle, by means of an angular velocity sensor; a roll rate estimating step for calculating an estimated roll rate, which is an angular velocity about a forward and rearward axis, on the basis of the detection value, detected during the detecting step, and a travelling speed of the vehicle; a bank angle estimating step of calculating an estimated bank angle of the vehicle from the estimated roll rate; a straight forward travel determining step of determining a straight forward travelling condition of the vehicle during the travel of the vehicle on the basis of the estimated roll rate and a value associated with the estimated bank angle; a time-of-straight-forward-travel drift amount estimating step of estimating a sensor drift amount during the straightforward travel of the vehicle from an output of the angular velocity sensor in the event that in the straight forward travel determining step the straight forward travelling condition is determined; and an angular velocity correcting step of correcting the output of the angular velocity sensor with the sensor drift amount estimated in the time-of-straight-forward-travel drift amount estimating step.

According to the above described construction, based on the estimated roll rate and the value associated with the estimated bank angle such as, for example, an estimated yaw rate or the estimated bank angle, the straight forward travelling condition of the vehicle is determined. In other words, the presence or absence of the slaloming condition is determined from the roll rate and the magnitude of the radius of turn is determined from the estimated yaw rate or the estimated bank angle. Accordingly, it is possible to accurately determine the straightforward travelling condition or the condition in which the vehicle turns at a large radius of turn enough to be considered as a straightforward travelling. Moreover, since the sensor drift amount during the straightforward travel is estimated from the output of the angular velocity sensor and the output of the angular velocity sensor is corrected with the sensor drift amount so estimated, an accurate calculation and removal of the sensor drift amount during the travelling can be accomplished with a simplified structure, resulting in an increase of the accuracy of estimation of the bank angle.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
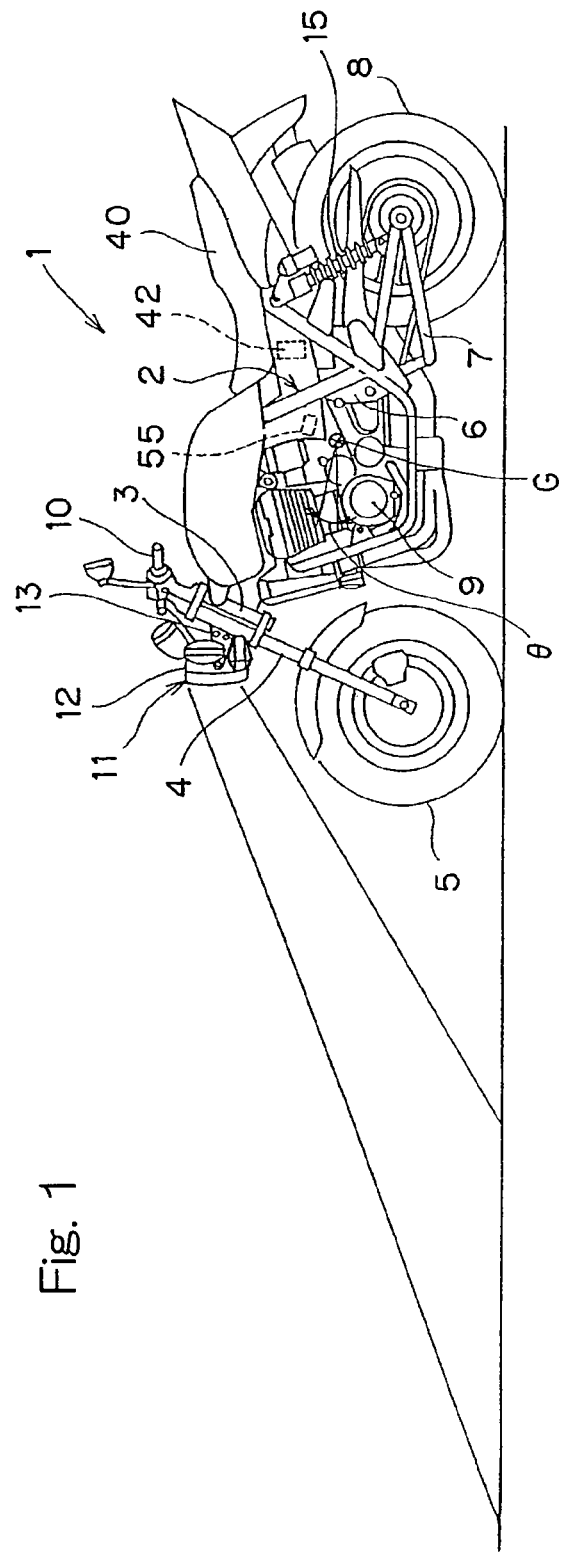
FIG. 1 is a side view showing a motorcycle equipped with a bank angle detector equipped headlamp device according to a first preferred embodiment of the present invention.

Preferred embodiments of the present invention will now be described in detail with reference to the accompanying drawings. In particular, FIG. 1 illustrates a schematic side view of a motorcycle equipped with a headlamp device utilizing a bank angle detecting device of the present invention. As shown therein, the motorcycle 1 is of a design in which a front wheel 5 is rotatably fitted to a front fork assembly 4 pivotally supported by a head tube 3 at a front end portion of a motorcycle frame structure 2 and a rear drive wheel 8 is rotatably fitted to a swingarm 7 pivotally supported by a swingarm bracket 6 at a lower intermediate portion of the motorcycle frame structure 2 so that such rear drive wheel 8 can be driven by a motorcycle combustion engine 9 mounted on another lower intermediate portion of the motorcycle frame structure 2 forwardly of the swingarm bracket 6. A rear wheel suspension 15 is mounted between the swingarm 7 and the motorcycle frame structure 2.

The front fork assembly 4 has a headlamp 12 mounted thereon through a bracket 13, the headlamp 12 forming a part of a head lamp device 11. It is, however, to be noted that in the case of the motorcycle of a type provided with a fairing, the headlamp 12 may be occasionally fitted to the motorcycle frame structure through the fairing.

Figure 2:
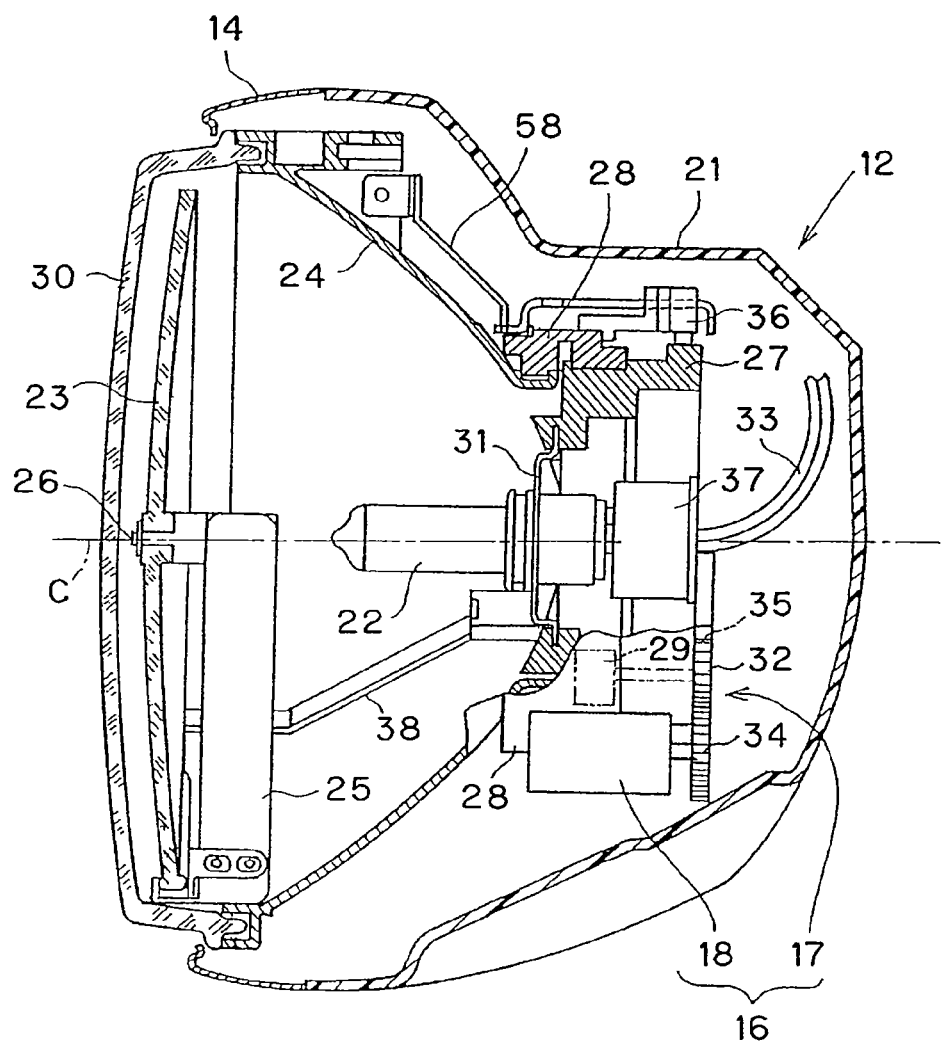
FIG. 2 is a longitudinal sectional view showing the headlamp device on an enlarged scale.

The headlamp 12 referred to above is schematically shown in FIG. 2 on an enlarged scale in a longitudinal sectional representation. In the headlamp 12 shown therein, an optical lens 23 is so disposed in front of a bulb 22, which is a light emitting element disposed within a lamp casing 21, in face-to-face relation therewith that the lens 23, together with the bulb 22, can be rotated about a longitudinal center axis C to thereby form an illuminating region varying mechanism 17. In other words, the lamp casing 21 is fitted to an annular rim member 14, positioned forwardly of the lamp casing 21, by means of at least one screw member (not shown), a generally or substantially bowl shaped reflector 24 disposed so as to surround the light emitting element 22 like a bulb is also fitted to the annular rim member 14 by the use of at least one hook and at least one screw member (both not shown), and the lens 23 is rotatably supported by a rotary arbor 26 of a lens support strut 25 provided in the reflector 24. The reflector 24 has a center portion provided with a rotary base 27 in coaxial relation with the lens 23, and the bulb 22 is fitted to a center portion of the rotary base 27 in alignment with the longitudinal center axis C through a bulb bracket 31.

The rotary base 27 is rotatably supported by a stationary base 28 positioned generally radially outwardly of the rotary base 27, which stationary base 28 is in turn supported by the reflector 24 through a bracket 58. The rotary base 27 is coupled with an outer peripheral portion of the lens 23 by means of an arm 38. In this way, the bulb 22 and the lens 23 are made rotatable relative to the lamp casing 21, the rim member 14 and the reflector 24. The reflector 24 has a front portion having a front covering 30 mounted thereon. Also, an electric cable 33 is connected with a bulb socket 37, into which the bulb 32 is plugged.

The rotary base 27 has an outer peripheral portion formed with a sector shaped driven gear 32 having gear teeth deployed an angle of substantially 180° about the longitudinal center axis C and, on the other hand, the stationary base 28 has an outer peripheral portion to which is fitted a driver 18 for driving the rotary base 27 about the longitudinal center axis C. This driver 18 may be in the form of, for example, a direct current motor. The driver 18 includes a drive shaft on which a round drive gear 34 is mounted.

Also, at a position spaced from the driver 18 in a direction circumferentially of the stationary base 28, the outer peripheral portion of the stationary base 28 is provided with an encoder 29 used to detect the angle of rotation of the rotary base 27, that is, the angle of rotation of both of the lens 23 and the bulb 22. Rotation of the driver 18 is transmitted to the rotary base 27 through the round drive gear 34 and then through the driven gear 32 and thus, the lens 23 rotates with the bulb 32. Accordingly, the driver 18 and the illuminating region varying mechanism 17 altogether constitute a light distribution adjusting mechanism 16.

The encoder 29 is connected with a round relay gear 35 meshed with the driven gear 32 and is hence rotatable together with the relay gear 35 to detect the amount of rotation (numerical quantity) or the angle of rotation of the driver 18 and then to detect the angle of rotation of both of the lens 23 and the bulb 22. This relay gear 35 has gear teeth equal in number to the number of gear teeth of the drive gear 34 and is therefore rotated the same amount as the drive gear 34.

The stationary base 28 is provided with a limit switch 36 for detecting an over rotation in excess of a predetermined angle range, over which the rotary base 27 is rotatable about the longitudinal center axis C, and then halting the driver 18 in the event of occurrence of such over rotation. Electric power cables or signal cables for the driver 18, the encoder 29 and the limit switch 36 as well as the electric cable 33 for the bulb 22 are drawn outwardly of the lamp casing 21 through cable lead-out hole (not shown) defined in the lamp casing 21.

The assembly of the lens 23 and the bulb 22 has the standard illuminating region property, in which at the zero angle of rotation thereof, it can give rise to such a region of illumination (light distribution) A that spreads leftwards and rightwards in a direction parallel to the horizontal line H, The illuminating region property of the kind referred to above can be imparted when, for example, the use is made of a light adjusting plate for adjusting the direction of divergence of rays of light from the bulb 22 and a front or rear surface of the lens 23 is formed integrally with a number of cylindrical lens elements or Fresnel lens elements.

The structure of the headlamp 12 may not necessarily be limited to that shown in and described in connection with the preferred embodiment, provided that the region of illumination cast by the headlamp can be altered when a drive signal is applied. By way of example, the headlamp 12 may not be necessarily limited to the type in which the lens 23 is angularly displaced as shown and hereinabove described, but may be of a type in which the reflector, which is a reflective plate, or a lamp body is angularly displaced. Although in the embodiment now under discussion the lens 23 is employed in the form of a scattering lens, the use may not be necessarily limited to the scattering lens.

Figure 3:
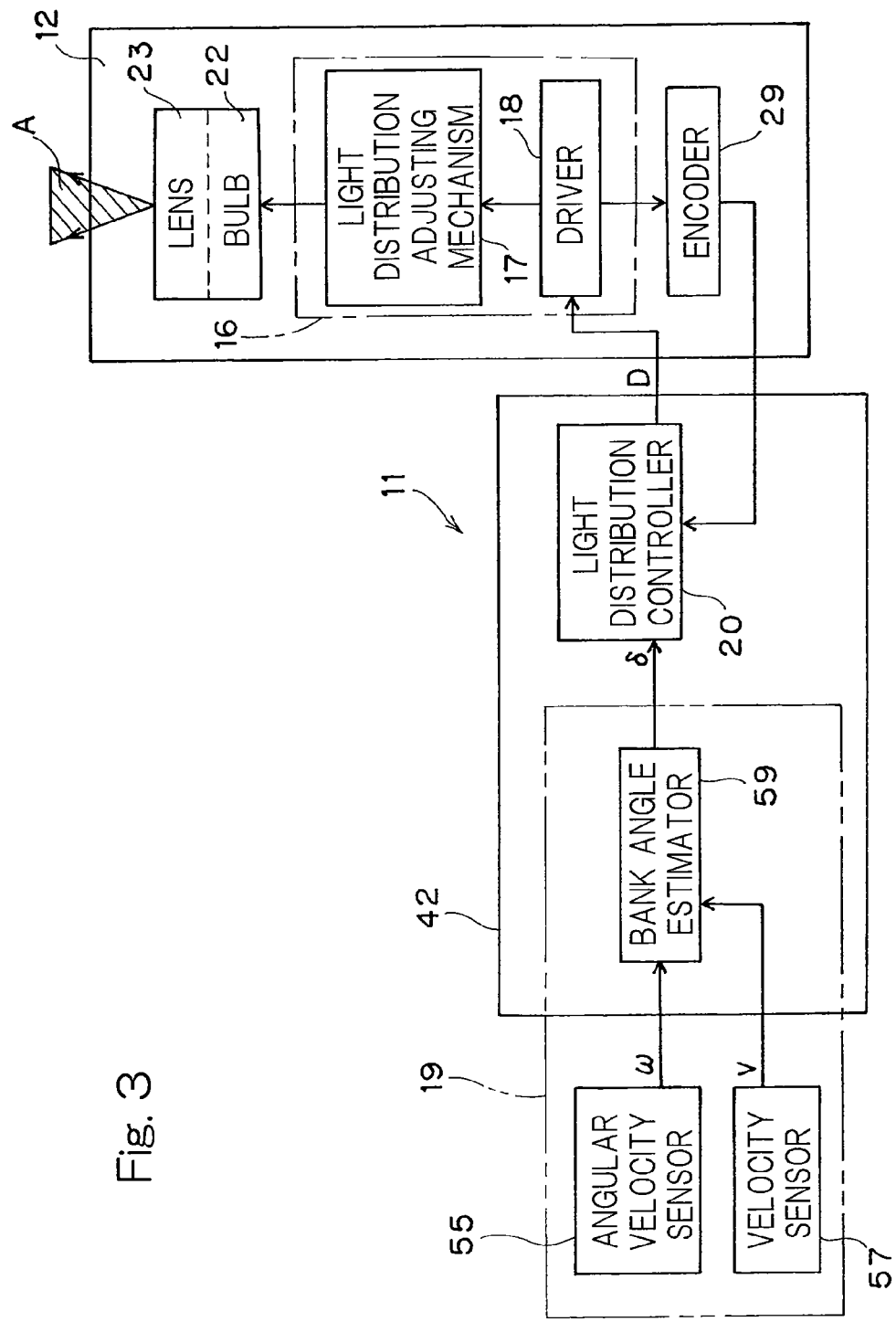
FIG. 3 is a circuit block diagram showing a schematic structure of the headlamp device.

Referring now to FIG. 3, the headlamp device 11 includes, inter alia, the headlamp 12 referred to previously, the driver 18 and the encoder (rotational position detector) 29 both provided in the headlamp 12, a bank angle detecting device 19 and a light distribution controller 20. The motorcycle body has defined therein three axes that passes across a reference point defined in an angular velocity sensor 55. Those three axes include a forward and rearward axis C1, a leftward and rightward axis C2 perpendicular to the forward and rearward axis C1 and a vertical axis C3 at right angles to the forward and rearward axis C1 and the leftward and rightward axis C2.

Specifically, the forward and rearward axis C1 extends in a horizontal direction parallel to the longitudinal sense of the motorcycle when the motorcycle body is in a condition travelling straight forward at a constant speed. The leftward and rightward axis C2 extends in a horizontal direction widthwise of the motorcycle body when the motorcycle body is in the condition travelling straight forward at a constant speed. The vertical axis C3 extends in a vertical direction at right angles to the forward and rearward axis C1 and the leftward and rightward axis C2 when the motorcycle body is in the condition travelling straight forward at a constant speed. Those axes C1 to C3 intersect with each other at the sensor reference point. Also, since those axes C1 to C3 are set in the angular velocity sensor 55, those axes C1 to C3 have their orientations that vary in accord with the motorcycle body as the orientation of the angular velocity sensor 55 changes with the motorcycle body.

The bank angle detecting device 19 shown in FIG. 3 is so designed and so configured that the angular velocity about the forward and rearward axis C1 (best shown in FIG. 6) of the motorcycle body, that is, an estimated roll rate P can be detected to output an estimated bank angle δ and the light distribution controller 20 can be activated in response to the estimated bank angle δ, fed from the bank angle detecting device 19, to control the light distribution adjusting mechanism 16. In any event, however, the details of the bank angle detecting device 19 will be described later.

The light distribution controller 20 is operable to control the driver 18 of the light distribution adjusting mechanism 16 in response to a feedback signal fed from the encoder 29 to thereby rotate both of the bulb 22 and the lens 23 through the illuminating region varying mechanism 17. It is, however, to be noted that the light distribution controller 20 may be so designed and so configured as to control the driver 18 of the light distribution adjusting mechanism 16 in response to an integration signal of a lamp speed command D, rather than in response to the feedback signal fed from the encoder 29.

The bank angle detecting device 19 referred to above is made up of the angular velocity sensor 55 so arranged as to incline at a predetermined angle θ about the leftward and rightward axis C2 (best shown in FIG. 6) relative to the forward and rearward axis C1 (also best shown in FIG. 6) of the motorcycle body, a velocity sensor 57 for detecting the travelling speed of the motorcycle and a bank angle estimator 59 operable to determine the estimated bank angle δ of the motorcycle on the basis of the angular velocity ω, detected by the angular velocity sensor 55, and the angle of inclination θ and the travelling speed v detected by the velocity sensor 57.

The velocity sensor 57 and the angular velocity sensor 55 sequentially output their detection values at intervals of a predetermined time. The travelling speed v may be determined from, for example, the number of revolutions of a motorcycle wheel, or from an output value of an acceleration sensor for detecting the acceleration in a forward and rearward direction, or a gear ratio and the number of revolutions of a motorcycle combustion engine.

Figure 6:
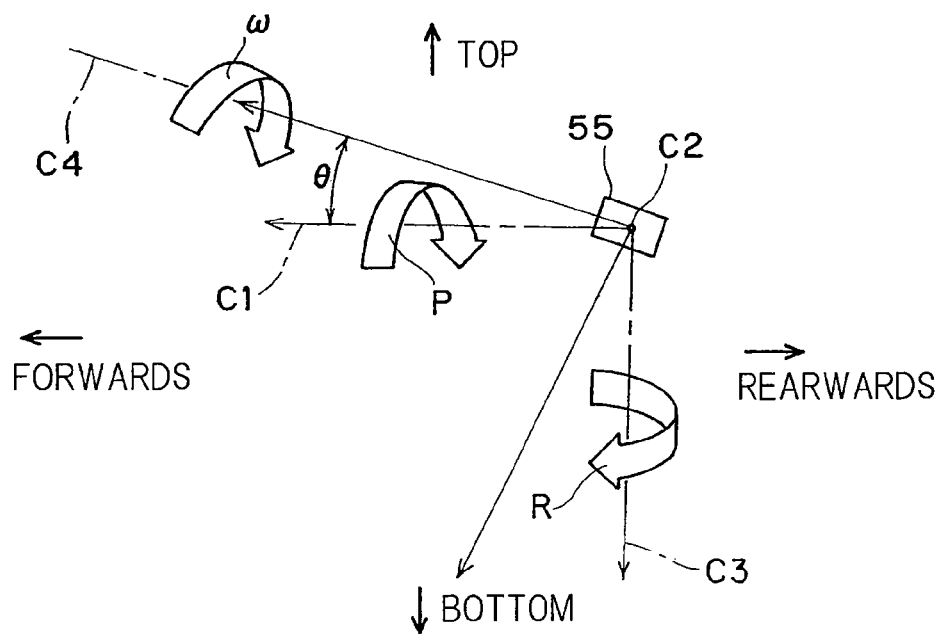
FIG. 6 is a schematic diagram showing the relation between the motorcycle coordinate system and the sensor mounting coordinate system.

The angular velocity sensor 55 is employed in the form of, for example, a gyro sensor and is operable to detect the angular velocity ω about a sensor axis C4 which is, as best shown in FIG. 6, so as to extend across the leftward and rightward axis C2 and angularly displaced at a predetermined inclination angle θ relative to the forward and rearward axis C1 in a plane, containing the forward and rearward axis C1 and the vertical axis C3. The angular velocity ω detected by the angular velocity sensor 55 contains a component of the estimated roll rate P, which is the angular velocity about the forward and rearward axis C1, and a component of an estimated yaw rate R which is the angular velocity about the vertical axis C3.

It is to be noted that in the illustrated embodiment now under discussion, with respect to the angular velocity sensor 55 used to detect the angular velocity about the predetermined sensor axis C4, the sensor axis C4 is so preferably positioned as to incline relative to both of the forward and rearward axis C1 and the vertical axis C3 and the shape and the attitude of the angular velocity sensor 55 may be suitably selected as desired.

Figure 4:
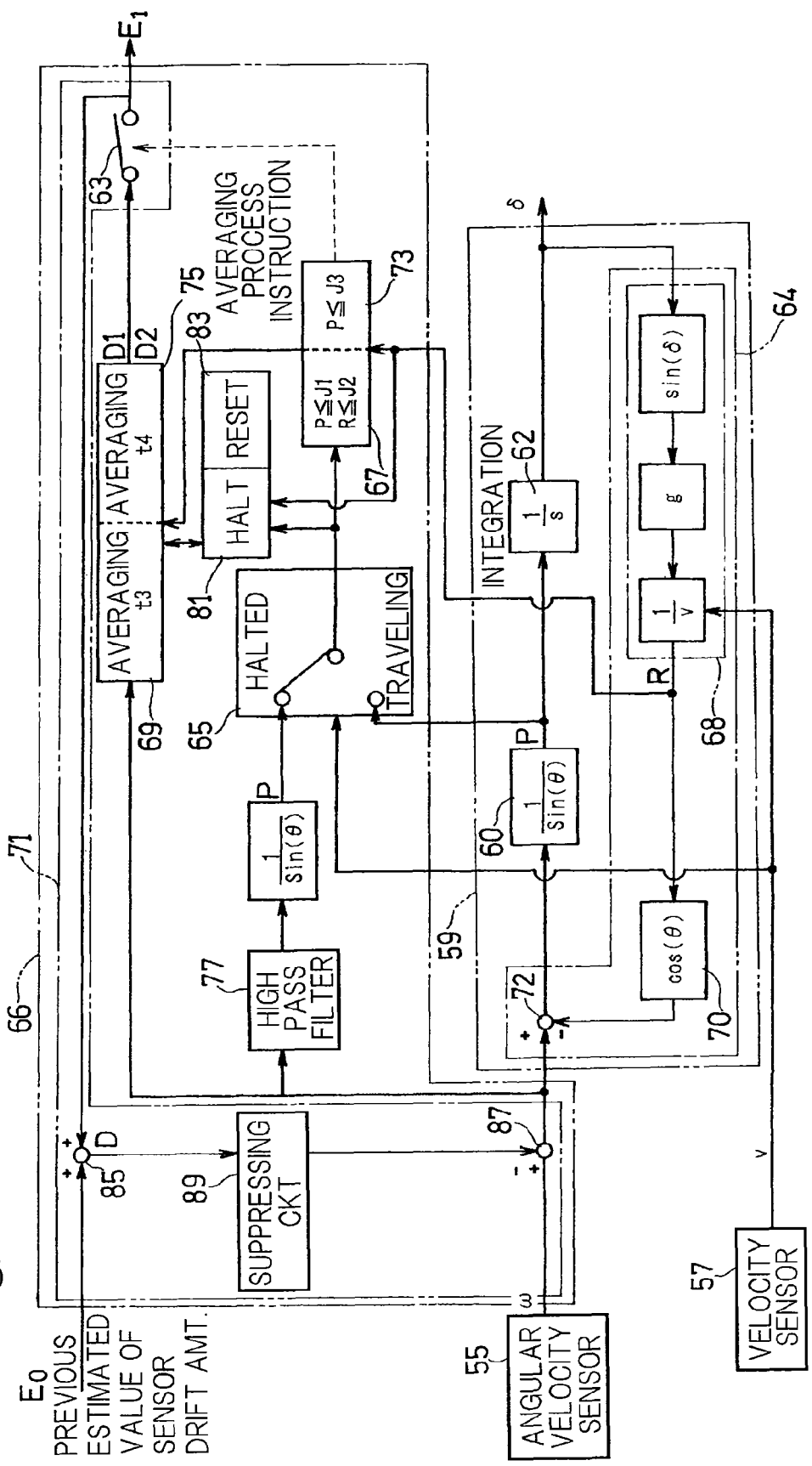
FIG. 4 is a circuit block diagram showing a schematic structure of a bank angle detecting device.

The details of the bank angle detecting device 19 are best shown in FIG. 4. The bank angle estimator 59 includes a roll rate estimating circuit 60 for calculating the estimated roll rate P from an output of the angular velocity sensor 55, an estimated yaw rate R as will be described later and the travelling speed v of the motorcycle, an angular velocity integrating circuit 62 for integrating the estimated roll rate P on a time basis to output the estimated bank angle δ, a feedback circuit 64 for determining the estimated yaw rate R, which is the angular velocity about the vertical axis C3 (shown in FIG. 6) of the motorcycle based on the estimated bank angle δ and the speed v and then performing a negative feedback of it to the angular velocity ω, and a drift removing circuit 66 for rendering the angular velocity ω to be zero when a predetermined straight forward travelling condition or a standstill condition is satisfied. The details of the drift removing circuit 66 will be described later.

The bank angle estimator 59 calculates the estimated bank angle δ by performing a time integration of the estimated roll rate P which has been obtained on the basis of the inclination angle θ of the angular velocity sensor 55, the angular velocity ω detected by the angular velocity sensor 55 and the speed v detected by the velocity sensor 57.

The feedback circuit 64 includes a yaw rate estimator 68 for calculating the estimated yaw rate R, which is a value associated with the estimated bank angle, on the basis of the estimated bank angle δ', which has been calculated previously, and the speed v, a yaw component estimator 70 for calculating a yaw component of the angular velocity sensor 55 by multiplying the estimated yaw rate R by cos θ, and a negative feedback circuit 72 for performing a negative feedback of the value of the yaw component to the angular velocity ω, which is a detection value of the angular velocity sensor 55. The negative feedback circuit 72 is employed in the embodiment now under discussion in the form of a subtractor.

In other words, it has been made that the estimated bank angle δ can be obtained from the estimated roll rate P which is corrected at each time with the estimated yaw rate R. For this reason, accumulation of influences caused by a zero point offset of the angular velocity sensor 55 and an integration error with passage of time is avoided.

Figure 5:
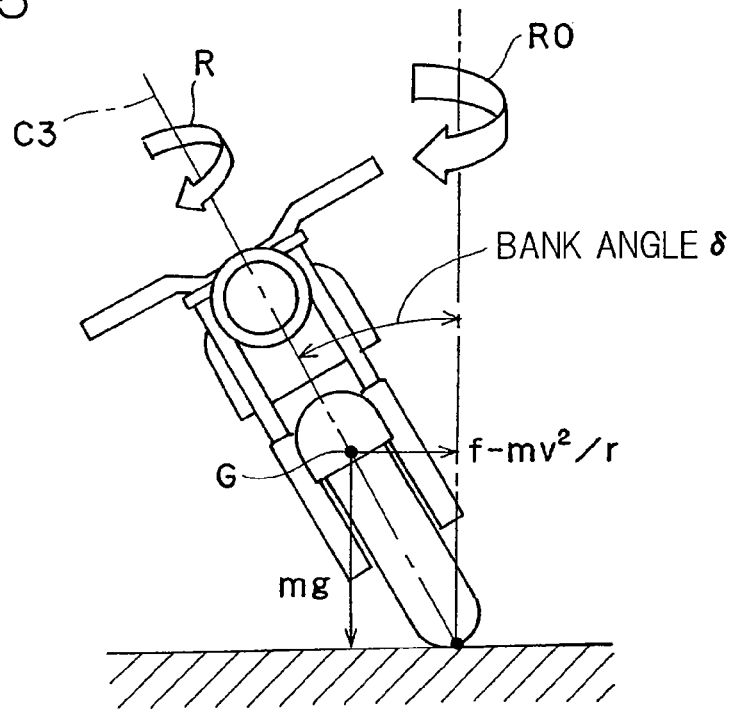
FIG. 5 is a front elevational view showing the motorcycle being banked.

A method of detecting the estimated bank angle δ with the bank angle estimator 59 will now be described in detail with particular reference to FIGS. 5 and 6. Assuming that the radius of turn of the motorcycle is expressed by r, the gravitational velocity is expressed by g and the angular velocity (the yaw rate in the stationary coordinate system) about the vertical axis that is set regardless of the attitude of the motorcycle body is expressed by R0, the estimated yaw rate R when the motorcycle is tilted at the bank angle δ relative to the vertical axis of the motorcycle body as shown in FIG. 5 is expressed by the following formula (2):

$$R = R0 \cdot \cos \delta \qquad (2)$$

On the other hand, the centrifugal force f acting on the center of gravity G of the motorcycle is expressed by the following formula (3) if the mass of the motorcycle is expressed by m:

$$f = m \cdot v \cdot v / r \qquad (3)$$

In the formula (3), the mass m is the sum of the masses of the motorcycle body and the motorcycle rider.

Since R0 can be expressed by v/r, that is, by the following formula (4), insertion of the formula (4) into the formula (3) results in the centrifugal force f expressed by the following formula (5):

$$R0 = v/r \qquad (4)$$

$$f = m \cdot v \cdot R0 \qquad (5)$$

Also, since at the bank angle δ such a relation as expressed by the following formula (6) establishes between the centrifugal force f acting on the motorcycle body and the gravitational force m·g, insertion of the formula (5) into the formula (6) results in the following formula (7):

$$\tan \delta = f/(m \cdot g) \qquad (6)$$

$$\tan \delta = v \cdot R0/g \qquad (7)$$

The formula (7) above, when the bank angle δ in the formula (2) above is inserted, can be expressed as follows:

$$\tan \delta = v \cdot R/(g \cdot \cos \delta) \qquad (8)$$

From the formula (8) above, such a relation as expressed by the formula (9) below can be obtained and, accordingly, the estimated bank angle δ can be expressed by the following formula (10):

$$\sin \delta = v \cdot R/g \qquad (9)$$

$$\delta = \sin^{-1}(v \cdot R/g) \qquad (10)$$

Since as best shown in FIG. 6, the angular velocity sensor 55 is disposed having been inclined at the inclination angle θ relative to the forward and rearward axis C1, the angular velocity ω measured by the angular velocity sensor 55 by the coordinate conversion from the motorcycle body coordinate system (single dotted line) to the sensor mounting coordinate system (solid line) results in combination of a roll component P·sin θ, containing the roll rate P, with a yaw component R·cos θ containing the yaw rate R and thus results in the following formula (11):

$$\omega = P \cdot \sin \theta + R \cdot \cos \theta \qquad (11)$$

It is to be noted that since the parameters P and R are not a value measured directly, they are hereinafter referred to as the estimated roll rate P and the estimated yaw rate R, respectively.

Determining the estimated yaw rate R from the formula (9) above and inserting it into the formula (11) above results in the estimated roll rate P which is expressed by the following formula (12):

$$P=[\omega-(g\cdot\sin\delta\cdot\cos\theta)/v]/\sin\theta \quad (12)$$

When this estimated roll rate P is integrated, the estimated bank angle δ is calculated. In other words, assuming that the estimated bank angle calculated previously is expressed by δ', the estimated bank angle δ is expressed by the following formula (13):

$$\delta = \int \frac{\omega - \frac{g}{v}\sin\delta'\cdot\cos\theta}{\sin\theta} dt \quad (13)$$

The yaw rate estimator 68 shown in FIG. 4 is operable to calculate the estimated yaw rate R (=g·sin δ'/v) with reference to the estimated bank angle δ', which has been measured previously, and the travelling speed v detected by the velocity sensor 57. The yaw component estimator 70 referred to previously is operable to calculate a yaw component R·cos θ, which would be detected by the angular velocity sensor 55, by multiplying the estimated yaw rate R by cos θ. The negative feedback circuit 72 is operable to output a roll component P·sin θ, which would be contained in the detection value ω of the angular velocity sensor 55, by subtracting the yaw component R·cos θ from the angular velocity ω(=P·sin θ+R·cos θ) that is measured from the angular velocity sensor 55.

The roll rate estimating circuit 60 referred to above is operable to calculate the estimated roll rate P (as expressed by the previously mentioned formula (12)) by dividing the estimated roll component P·sin θ by sin θ. In other words, the roll rate estimating circuit 60 determines the roll rate component P·sin θ by subtracting the yaw rate component R·cos θ, that is, (g/v)·sin δ·cos θ from the angular velocity ω detected by the angular velocity sensor 55 and then calculates the estimated roll rate P by dividing this value, so determined, by sin θ. Thus, the roll rate estimating circuit 60 calculates the estimated roll rate P on the basis of the angular velocity ω, fed from the angular velocity center 55, and the travelling velocity v inputted to the yaw rate estimator 68. The angular velocity integrating circuit 62 is operable to calculate the estimated bank angle δ by integrating the estimated roll rate P (as expressed by the previously mentioned formula (13)).

The drift removing circuit 66 referred to above includes a run/halt determiner 65 for determining, based on the velocity v, whether the motorcycle is travelling or halted, a straight forward travel determiner 67 for determining during the travel of the motorcycle, based on the detection value w of the angular velocity sensor 55, whether the motorcycle is travelling straight forward, a time-of-straight-forward-travel drift amount determiner 69 for estimating a sensor drift update amount D1 during the straight forward travel of the to motorcycle by averaging a signal ω1, in which an estimated sensor drift amount D has been removed from the output ω of the angular velocity sensor 55, in the event that the straight forward travel determiner 67 determines the motorcycle travelling straight forward, and an angular velocity corrector 71 for correcting the output ω of the angular velocity sensor 55 with the sensor drift amount D.

The straight forward travel determiner 57 referred to above is of a type capable of determining the motorcycle then travelling straight forward, when a condition, in which the estimated roll rate P is smaller than a predetermined first determination value J1, sustains for a constant time t1 and, at the same time, a condition, in which the estimated yaw rate R is smaller than a predetermined second determination value J2, sustains for the constant time t1.

Conditions of the motorcycle body during the travelling thereof can be classified into straight forward travelling, turning and slaloming. In the straight forward travelling condition, neither the roll rate nor the yaw rate occur, but during the turning condition, only the yaw rate occurs and no roll rate occur and during the slaloming condition both of the roll rate and the yaw rate occur. Accordingly, if the straight forward travelling condition is detected during the travelling of the motorcycle, estimation of the sensor drift amount D is possible because the input ω of the angular velocity sensor 55 is supposed to involve only the sensor drift amount D.

As best shown in FIG. 4, in the course of the estimation of the bank angle δ, the estimated roll rate P is calculated. In the event that the condition of the estimated roll rate P being sufficiently small continues for a constant length of time, it can be determined that the motorcycle body is travelling straight forward or turning. Also, if it can be determined that the yaw rate is zero, the straight forward travelling condition and the turning condition can be discriminated. However, when the motorcycle travels straight forward while the sensor drift amount d exists, the estimated yaw rate R shown in FIG. 4 is calculated as d/cos θ. In other words, the straight forward travelling condition and the turning condition cannot be discriminated from each other only by the determination of whether or not the estimated yaw rate R is zero.

However, when the estimated yaw rate R is 1 (deg/sec.), it means that the radius of turn at a travelling velocity of 30 km/hr. is about 336 meters and the radius of turn at a traveling velocity of 150 km/hr. is about 1683 meters and there should be no problem that this condition is taken as the straight forward travelling condition. Accordingly, in the event that the condition of the estimated yaw rate R being sufficiently small continues for the constant length of time, it is determined as the straight forward travelling condition taking place. In the embodiment now under discussion, the straight forward travel determiner 67 determines the straight forward traveling condition with reference to the estimated roll rate P and the estimated yaw rate R, but it may be determined with reference to the estimated bank angle δ in place of the estimated yaw rate R or, alternatively, it may be determined with reference to both of the estimated yaw rate R and the estimated bank angle δ. Thus, using the estimated roll rate P and a value (the estimated yaw rate P or the estimated bank angle δ) associated with the estimated bank angle δ, the straight forward travelling condition is determined.

The time-of-straight-forward-travel drift amount determiner 69 referred to above includes an averaging circuit for averaging a signal ω1, for a predetermined length of time t3, which signal ω1 corresponds to the output ω of the angular velocity sensor 55, from which the estimated drift amount D has been removed, in the event that the straight forward travelling condition is determined by the straight forward travel determiner 67. The predetermined length of time t3 is a length of time during which the averaging process is performed under the straight forward travelling condition. As hereinabove described, since during the straight forward travelling condition, the angular velocity sensor input ω represents the sensor drift amount D, the sensor drift amount D can be estimated from the angular velocity sensor input ω generated at the time the straight forward travelling condition is so determined. Also, the average value after the averaging process has been performed for the predetermined length of time t3 is rendered to be a time-of-straight-forward-travel sensor drift update amount D1 in consideration of influences which would be brought about by noises.

The drift removing circuit 66 also includes a standstill determiner 73 for determining a standstill condition of the motorcycle from the estimated roll rate P during the halt of the motorcycle and a standstill time drift amount estimator 75 for estimating a sensor drift update amount D2 at the time of standstill by averaging the signal $\omega 1$, which corresponds to the output $\omega$ of the angular velocity sensor 55 from which the estimated sensor drift amount D has been removed, in the event that the standstill determiner 73 determines the standstill condition. The standstill determiner 73 referred to above is of a type that determines the standstill condition when a condition in which the estimated roll rate P is smaller than a predetermined third determination value J3 sustains for a constant time t2.

The angular velocity corrector 71 includes a switch 63 adapted to be switched on by straight forward travel determination of the straight forward travel determiner 67 or standstill determination from the standstill determiner 73 and is operable to perform correction based on the time-of-straight-forward-travel sensor drift update amount D1 or the sensor drift update amount D2 at the time of standstill. The estimated roll rate P inputted to the standstill determiner 73 is that from which a change in frequency lower than a predetermined frequency f has been removed by means of a high pass filter 77. The value of the predetermined frequency f is chosen to be, for example, 0.2 Hz and preferably 0.1 Hz. The removal of the low frequency change discussed above may be accomplished by means of any suitable means other than the high pass filter 77 or may be dispensed with.

Since during the halt the motorcycle body does not turn, that is, no yaw rate is generated, the output $\omega$ of the angular velocity sensor 55 corresponds to the sum of the roll rate and the sensor drift amounts D during the standstill time. While the roll rate is zero so long as a stand is held in contact with a ground surface, it varies when a rider gets on and the motorcycle body is rocked with the rider straddling the motorcycle body. On the other hand, the sensor drift amount can be regarded as a constant value if viewed at intervals of a time in unit of a few tens seconds. Even though the sensor drift amount changes as a result of an external factor such as, for example, change in temperature, the speed of such change is sufficiently slow when compared with a change in roll rate brought about by an action of a human being. When by the utilization of this characteristic, a high pass output process by the high pass filter 77 is applied to the signal $\omega 1$ of a kind in which the estimated drift amount D has been removed from the output $\omega$ of the angular velocity sensor 55, the roll rate component can be extracted. In other words, in the event that at the condition in which the output of the high pass filter 77 is sufficiently low lasts for a constant time, it means that the motorcycle body is held standstill.

The standstill time drift amount estimator 75 includes an averaging circuit capable of averaging the signal $\omega 1$ for a predetermined length of time t4, which signal $\omega 1$ corresponds to the output $\omega$ of the angular velocity sensor 55 from which the estimated drifted amount D has been removed, in the event that the standstill determiner 73 determines the standstill condition. The predetermined length of time t4 is a length of time during which the averaging process is carried out under the standstill condition. In the embodiment now under discussion, the averaging process time t3 during the straight forward travelling and the averaging process time t4 during the standstill are chosen to be values different from each other, but they may be the same times.

As hereinabove described, since during the motorcycle body standstill determination, the roll rate is sufficiently small, such a relation that the output $\omega$ of the angular velocity sensor 55 is the sensor drift amount D establishes. Accordingly, the sensor drift amount D can be estimated from the output $\omega$ of the angular velocity sensor 55. Also, in consideration of influences which would be brought about by noises, the average value which has been averaged for the constant length of time t4 is rendered to be a standstill time sensor drift update amount D2.

The drift removing circuit 66 referred to above includes a process suspending circuit 81 operable to suspend the calculation of the time-of-straight-forward-travel drift update amount D1, which is performed by a straight forward travel time drift amount estimator 69, in the event that the estimated roll rate P and the estimated yaw rate R exceed the first and second determination values J1 and J2, respectively, within the predetermined length of time t3 during which the averaging process takes place. Arrangement may alternatively be made that in the event that either of the estimated roll rate P and the estimated yaw rate R exceeds the first determination value J1 or the second determination value J2, the calculation is suspended. The calculation is resumed when the condition, in which the estimated roll rate P and the estimated yaw rate R are smaller than the first and second determination values J1 and J2, respectively, within a predetermined length of time t5 subsequent to determination of the straight forward travelling, lasts for the predetermined length of time t1. Also, in the event that the calculation of the time-of-straight-forward-travel drift update amount D1 by the straight forward time drift amount estimator 69 fails to complete within the predetermined length of time t5 subsequent to the determination of straight forward travel or in the event that the estimated roll rate P and the estimated yaw rate R exceed respective rocking determination values J4 and J5, a reset circuit 83 for invalidating such calculation process is included by the drift removing circuit 66. Accordingly, when the calculation is interrupted in the event that such calculation is protracted because an output variation of the angular velocity sensor 55, for example, is considerable, prevention of an erroneous estimation of the drift amount and a useless continuance of the calculation during an instable condition can be avoided. In any event, the details of the process taking place in the drift removing circuit 66 will be described later.

The angular velocity corrector 71 captures an estimation value E1 of the straight forward travel time drift update amount D1 or the standstill time drift update amount D2 after completion of the averaging process and obtains an estimated sensor drift amount D by adding it to an estimated value E0 of the previous cycle by means of a first adding circuit 85. The sensor drift of the angular velocity sensor 55 can be removed when the estimated sensor drift amount D is subtracted by a first subtracting circuit 87 from the output $\omega$ of the angular velocity sensor 55. A suppressing circuit 89 for suppressing a change in correction may be introduced between the first adding circuit 85 and the first subtracting circuit 87. The suppressing circuit 89 is used for loosening the speed of change of the estimated sensor drift amount D and is operable to set a speed of change enough to remove the drift within, for example, a (0.5×t3) time.

The bank angle estimator 59 and the light distribution controller 20 are built in a control unit 42 shown in FIG. 3 and are disposed, for example, below a motorcycle seat assembly 40. The angular velocity sensor 55, although it is preferably arranged in the vicinity of the center of gravity G defined as including the motorcycle body and the motorcycle rider, may be disposed at any suitable location, provided that a sufficient rigidity can be secured and, therefore, may not be necessarily limited to the neighborhood of the center of gravity G.

As can readily be understood from the formula (11) above, as the inclination angle θ of the angular velocity sensor 55 is small, that is, approaches 0°, influences which would be brought about by the yaw component R·cos θ, will become considerable. Conversely, as the inclination angle θ becomes large, that is, approaches 90°, the influences brought about by the roll component P·sin θ will become considerable. In view of this, the inclination angle θ of the angular velocity sensor 55 shown in FIG. 6 is preferably within the range of 30 to 60° and is more preferably 45°. It is, however, to be noted that since the optimum angle varies depending on the accuracy (drift amount) of the angular velocity sensor 55 and/or the driving characteristic of the motorcycle body, the angle smaller than 30° and the angle larger than 60° are to be construed as included within the spirit of the present invention.

Figure 7:
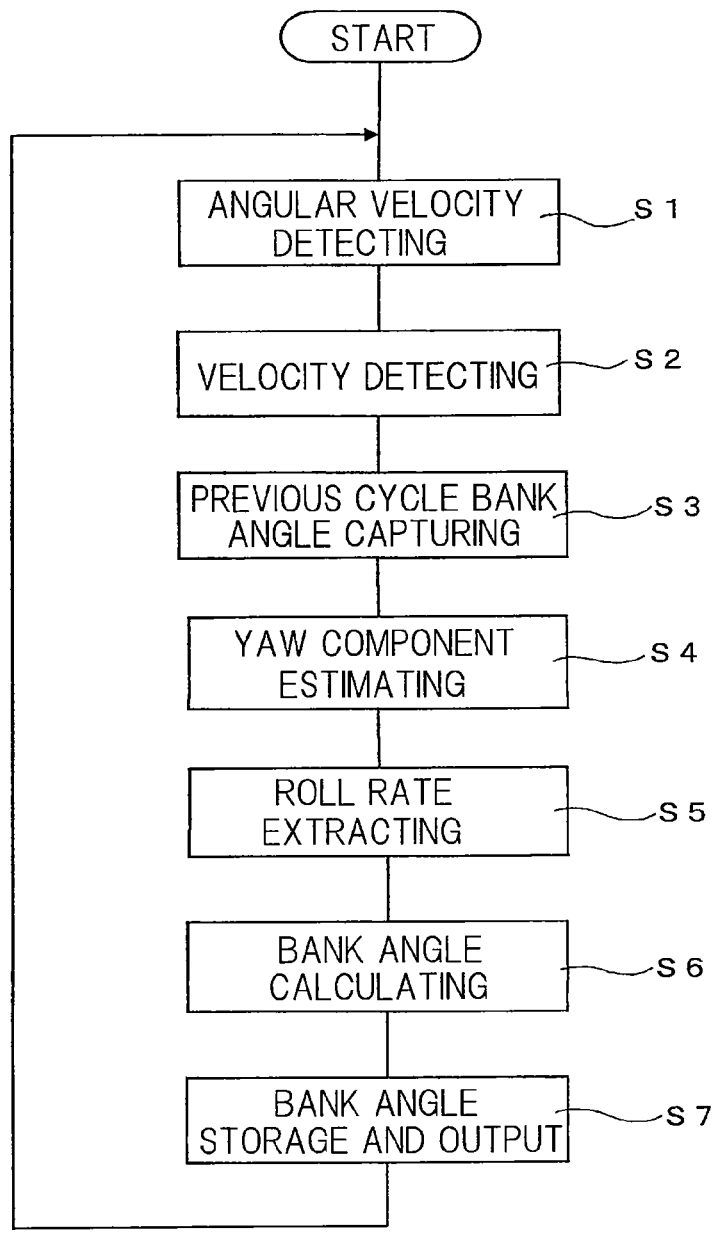
FIG. 7 is a flowchart showing the sequence of calculation of the estimated bank angle.

The flowchart showing the sequence of calculating the estimated bank angle δ referred to previously is such as shown in FIG. 7. Referring now to FIG. 7, subsequent to the start of the process of calculating the bank angle δ, an angular velocity detecting step S1 takes place to successively detect the angular velocity ω, in which the roll component P·sin θ containing the estimated roll rate P and yaw component R·cos θ containing the estimated yaw rate R are combined, at intervals of a predetermined time.

It is to be noted that in the embodiment now under discussion, the roll component P·sin θ and the yaw component R·cos θ are detected with the use of the single angular velocity sensor 55 (best shown in FIG. 6) that is arranged so as to incline at the inclination angle θ, but even when separate sensors are employed for the detection of the roll rate and the detection of the yaw rate, the flowchart for calculating the estimated bank angle such as shown in FIG. 7 can be equally applied.

After the angular velocity detecting step S1, the travelling speed v of the motorcycle is detected at a velocity detecting step S2, followed by a previous cycle bank angle capturing step S3. During the previous cycle bank angle capturing step S3, an estimated bank angle $\delta_{n-A}$ determined at a timing $t_{n-A}$ preceding a timing to be noticed $t_n$, is captured. In the embodiment now under discussion, the estimated bank angle recorded during a bank angle storage and output step S7 as will be described later is captured.

The previous cycle bank angle capturing step S3 is followed by a yaw component estimating step S4, at which using the previous cycle estimated bank angle $\delta_{n-A}$ captured at the previous cycle bank angle capturing step S3, the yaw rate $R_{n-A}$ when the motorcycle tilts at the travelling speed v at the timing to be noticed $t_n$ is calculated and, also, the yaw component $R_{n-A}$·cos θ detected by the angular velocity sensor 55 when the motorcycle turns at this yaw rate R is calculated. In the embodiment now under discussion, the yaw rate $R_{n-A}$ is determined as $g(\sin \delta_{n-A})/v$.

A roll rate extracting step S5 takes place subsequently, at which the yaw component $R_{n-A}$·cos θ is subtracted from the angular velocity $\omega_n$ at the timing to be noticed $t_n$ to determine the roll component $P_n$·sin θ and the roll rate $P_n$ is extracted from this roll component $P_n$·sin θ. Thereafter, a bank angle calculating step S6 takes place, at which the estimated bank angle $\delta_n$ of the motorcycle at the timing to be noticed $t_n$ is calculated by integrating roll rates P successively extracted during a period from a predetermined timing $t_o$ to the timing to be noticed $t_n$.

Finally, the bank angle storage and output step S7 takes place, at which the calculated estimated bank angle $\delta_n$ is recorded and outputted. The recorded estimated bank angle $\delta_n$ is captured as the preceding cycle bank angle $\delta_{n-A}$ at the preceding cycle bank angle capturing step S4 during the subsequent cycle of calculation of the estimated bank angle.

Figure 8:
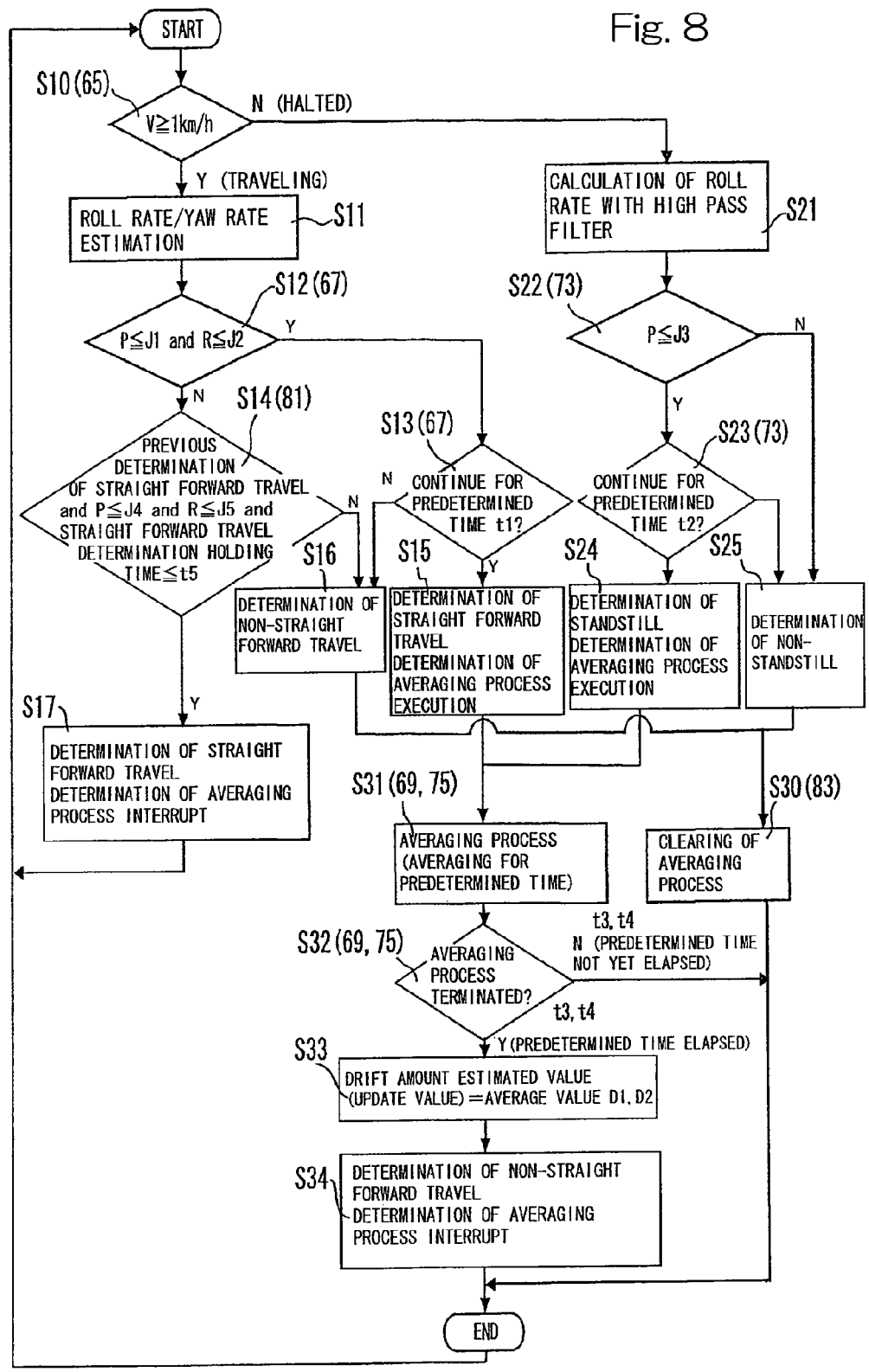
FIG. 8 is a flowchart showing the sequence of removal of a sensor drift.

Referring now to FIG. 8, the process of removal of the sensor drift will now be described. The bank angle detecting process shown in FIG. 7 and the sensor drift removing process shown in FIG. 8 take place simultaneously. At the outset, whether the motorcycle is travelling or halted is determined by a travel/halt determiner 65 based on the velocity sensor 57 at a step S10, which is a travelling condition determining step shown in FIG. 8. This determination is carried out in terms of whether the motorcycle velocity is higher or lower than 1 km/hr.

If the motorcycle is determined as halted at the step S10, a step S21 takes place, at which a signal ω1 corresponding to the angular velocity sensor input ω, from which the estimated drift amount D has been removed, is inputted to the high pass filter 77 to calculate the estimated roll rate P from which the low frequency change has been removed. The calculating step S21 is followed by a step S22 at which the standstill condition is determined. During the standstill condition determining step S22, the estimated roll rate P obtained at the step S21 is compared with the third determination value J3. If the estimated roll rate P is higher than the third determination value J3, the non-standstill condition is determined at a step S25. On the other hand, if the estimated roll rate P is lower than or equal to the third determination value J3, the program flow goes to a step S23, at which whether or not the condition, in which the estimated roll rate P is lower than or equal to the third determination value, sustains a length of time longer than the predetermined time t2. In the event that it sustains the length of time longer than the predetermined time t2, a step S24 takes place, at which the standstill condition is determined, or otherwise a non-standstill condition is determined at the step S25. The third determination value J3 is chosen to be, for example, 2 deg/sec and the predetermined length of time t2 is chosen to be, for example, 2 seconds.

If the motorcycle is determined as in the travelling condition at the step S10, a step S11 takes place at which the roll rate P and the yaw rate R are estimated. At this estimating step S11, the estimated yaw rate R and the estimated roll rate P are captured respectively from the yaw component estimating step S4 and the roll rate extracting step S5 both shown in the flowchart of FIG. 7. Thereafter at a step S12 in the flowchart of FIG. 8, at which the straight forward travelling condition is determined, the straight forward travelling condition is determined by the straight forward travel determiner 67 using the estimated yaw rate R and the estimated roll rate P. More specifically, the estimated roll rate P is compared with the first determination value J1 and the estimated yaw rate R is compared with the second determination value J2. If the estimated roll rate P is lower than or equal to the first determination value J1 and the estimated yaw rate R is also lower than or equal to the second determination value J2, the program flow goes to a step S13, at which whether or not the condition, in which the estimated roll rate P is lower than or equal to the first determination value J1 and the estimated yaw rate R is lower than or equal to the second determination value J2, lasts a length of time longer than the predetermined time t1 is determined by the straight forward travel determiner 67. In the event that the condition of the estimated roll and yaw rates P and R being lower than the first and second determination values J1 and J2, respectively, lasts the length of time longer than the predetermined length of time t1, the straight forward travelling condition is determined at a step S15, or otherwise the non-straight forward travelling condition is determined at a step S16. The first and second determination values J1 and J2 are, for example, 2 deg/sec and 1.5 deg/sec, respectively, and the predetermined length of time t1 is chosen to be, for example, 2 seconds.

If it is determined at the step S12 that at least one of the estimated roll rate P and the estimated yaw rate R is larger than the first and second determination values J1 and J2, the step S12 is followed by a step S14, at which determination of whether the averaging process is to be suspended is carried out. Specifically, if at the step S14 it is determined that the estimated roll rate P and the estimated yaw rate R are lower than or equal to the respective rocking determination values J4 and J5 and a predetermined length of time t5 subsequent to the determination of the straight forward travelling condition fails to go on, a step S17 takes place at which "the straight forward travelling condition and interruption of the averaging process" is determined. Accordingly, an erroneous estimation of the drift amount during the instable condition and protraction of the calculation because of unavailability of the sensor drift amount are avoided. The rocking determination values J4 and J5 referred to above are, for example, 6 deg/sec and 4.5 deg/sec, respectively, and the predetermined length of time t5 is chosen to be, for example, 10 seconds. If the length of time exceeds the predetermined time t5, or if the estimated roll rate P and the estimated yaw rate R exceed the respective rocking determination values J4 and J5, the non-straight forward travelling condition is determined at the step S16.

If it is determined at the step S16 or the step S25, the non-straight forward travelling condition or the non-standstill condition is determined, the program flow goes to an invalidating (resetting) step S30 at which reset take places. At this step S30, the averaging process then taking place is cleared by the reset circuit 83 with the program flow consequently returning to the start. On the other hand, if at the step S17, the "straight forward travelling condition and interruption of the averaging process" is determined, neither the averaging process nor resetting take place and the program flow immediately goes to the start.

When the standstill condition is determined at the step S24 or the straight forward travelling condition is determined at the step S15, the program flow goes to a sensor drift update amount estimating step S31, at which the straight forward travelling drift amount estimator 69 or the standstill time drift amount estimator 75 estimates the sensor drift update amount, respectively. At this step S31, a process of averaging the signal ω1, which corresponds to the output ω of the angular velocity sensor 55 from which the estimated drift amount D is removed, takes place.

At a subsequent step S32, it is determined whether or not the averaging process continues for a predetermined length of time t3 and t4. If it is determined at the step S32 that the averaging process continues for the predetermined length of time t3 or t4, the averaging process terminates. In this instance, the predetermined length of time t3 for the straight forward travelling condition is chosen to be, for example, 8 seconds and the predetermined length of time t4 for the standstill condition is chosen to be, for example, 4 seconds. In the event that the straight forward travelling condition or the standstill condition is released within the predetermined length of time t3 or t4, respectively, that is, the step S32 indicates the non-straight forward travelling condition or the non-standstill condition, the averaging process is cleared at the step S30 and the calculation of the sensor drift amount does not terminate.

If the averaging process terminates, the program flow goes to a step S33 at which the sensor drift amount is extracted. At this step S33, the straight forward-travelling-time drift update amount D1 so averaged or the standstill-time drift update amount D2 so averaged is extracted and, after it has been added to the previous cycle estimated value E0 by the first adding circuit 85, best shown in FIG. 4, to obtain the estimated sensor drift amount D, this estimated sensor drift amount D is subtracted from the output ω of the angular velocity sensor 55 by the first subtracting circuit 87 through the suppressing circuit 89 to thereby remove the sensor drift from the angular velocity sensor 55. After the extraction of the sensor drift, the straight forward travelling condition or the standstill condition and the averaging process are reset at a step S34 with the program flow consequently returning to the start.

Figure 9:
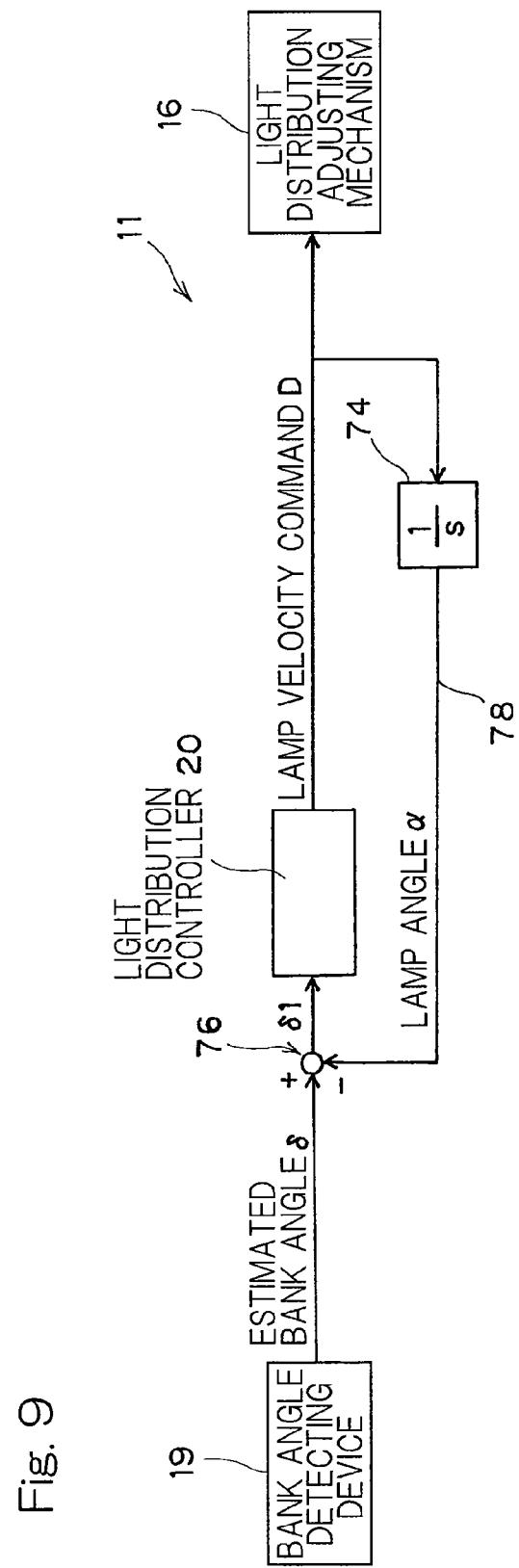
FIG. 9 is a circuit block diagram showing a schematic structure of the headlamp device according to the first embodiment of the present invention, illustrating the relation between the estimated bank angle and the lamp angle.

FIG. 9 illustrates a circuit block diagram for controlling a lamp angle based on the estimated bank angle δ which has been calculated by the bank angle detecting device 19 of the present invention. The headlamp device 11 of the type described previously includes the light distribution controller 20, a lamp velocity integrating circuit 74 for determining the lamp angle α through the time integration of a lamp velocity command value D that is outputted from the light distribution controller 20, a second subtracting circuit 76 for determining a difference between the previously discussed estimated bank angle δ and the lamp angle α, and a feedback line 78 through which an output of the lamp velocity integrating circuit 74 is fed back to a negative input of the second subtracting circuit 76.

The second subtracting circuit 76 is operable to generate the difference (δ−α) between the estimated bank angle δ, outputted from the bank angle detecting device 19, and the lamp angle α, outputted from the lamp velocity integrating circuit 74, as a lamp angle control deviation δ1. The light distribution controller 20 is operable to output the lamp velocity command D based on an output value of the second subtracting circuit 76. The lamp velocity integrating circuit 74 is operable to output the lamp angle α by integrating the lamp velocity command D. The feedback line 78 is operable to feed the lamp angle α, which is an output of the lamp velocity integrating circuit 74, back to the negative input of the second subtracting circuit 76. The light distribution controller 20 is operable to control the light distribution adjusting mechanism 16.

By the operation of the light distribution adjusting mechanism 16, both of the lens 23 and the bulb 22, shown in FIG. 3, are rotated in a direction counter to the direction in which the motorcycle body is banked, to thereby rotate the region of illumination (light distribution) A in that reverse direction at a speed equal to the lamp velocity command D (FIG. 9). At this time, the angle of rotation of the bulb 22 and the lens 23 is so chosen by controlling the rotation of the driver 18 to attain a value within the range of a value equal to the estimated bank angle δ to a value twice the estimated bank angle δ. The light distribution controller 20 causes the driver 18 to halt when the lamp angle α attains the estimated bank angle δ. Accordingly, the region of illumination A is rotated by the angle, corresponding to the estimated bank angle δ (FIG. 9) in a direction reverse to the direction in which the motorcycle is banked. It is to be noted that the lamp angle α may be delivered from the quantity of rotation of the driver 18 detected by the encoder 29.

Figure 13:
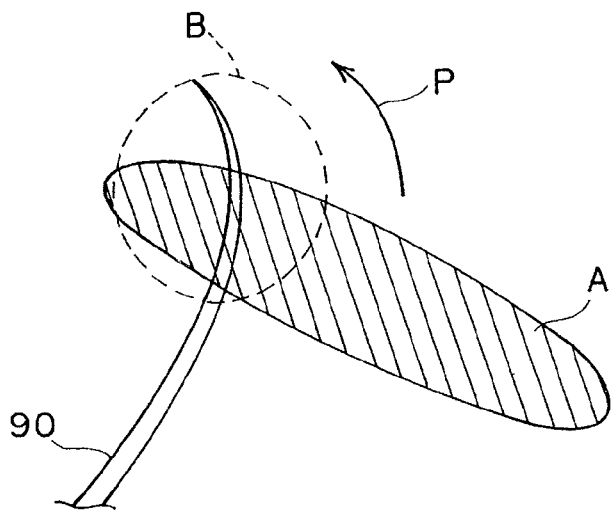
FIG. 13 is a schematic diagram of the forward sight of the motorcycle rider during the cornering, showing the region of illumination available during the cornering of the motorcycle.
Figure 14:
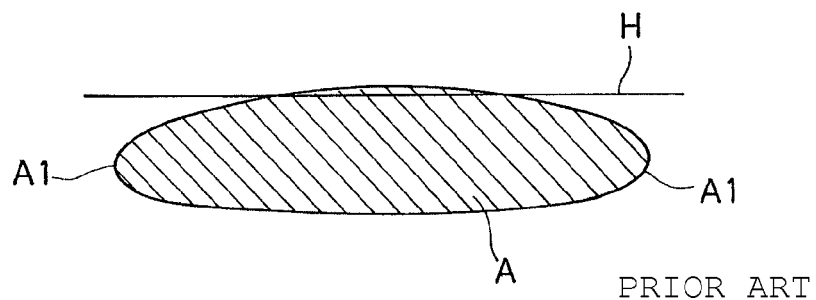
FIG. 14 is a schematic diagram of the forward sight of the motorcycle rider during the straight forward travel of the motorcycle, showing the region of illumination available during the straight forward travel of the motorcycle.
Figure 15:
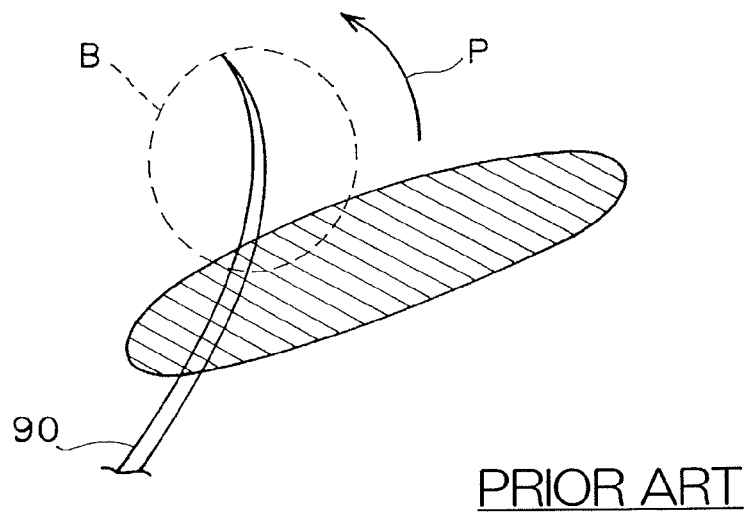
FIG. 15 is a schematic diagram of the forward sight of the motorcycle rider during the cornering, showing the region of illumination available during the cornering of the motorcycle.

When as shown in FIG. 13 the motorcycle changes its direction of travel so as to turn towards, for example, leftwards as shown by the arrow P along the curved lane 90, the region of illumination A of the headlamp device 11 changes from a condition, in which the region of illumination A extends leftwards and rightwards along the horizontal line H during the straight forward travel of the motorcycle as shown in FIG. 14, to a condition, in which the region of illumination A is tilted upwardly leftwards as shown in FIG. 13. As a result, as compared with the case exhibited by the conventional headlight device shown in and discussed with reference to FIG. 15, much light can be distributed in a region inwardly of the direction of turn (a portion B encompassed by the phantom circle in FIG. 15) to which the rider's eyes are directed, and, thence, a correspondingly large field of view can be obtained.

It is, however, to be noted that depending on the shape of the region of illumination A, it may occur that distribution of light towards the region inwardly of the turning direction, to which the rider's eyes are directed, is increased by rotating the region of illumination A in the direction, conforming to, not reverse to, the direction in which the motorcycle is banked, by an angle corresponding to the magnitude of the estimated bank angle δ.

According to the construction hereinbefore described, since the straight forward travelling condition of the motorcycle is determined based on not only the estimated yaw rate R, estimated from the estimated bank angle δ, but also the estimated roll rate P, the determination of the straight forward travelling condition can be accomplished accurately. In addition, since based on the signal ω1, which corresponds to the output ω of the angular velocity sensor 55 from which the estimated drift amount D has been removed, the sensor drift update amount D1 during the straight forward travel of the motorcycle is estimated and the output ω of the angular velocity sensor 55 is corrected with the sensor drift amount D, which has been calculated based on the sensor drift update amount D1 during the straight forward travel of the motorcycle, an accurate calculation and removal of the sensor drift during the travel of the motorcycle can be accomplished with a simplified structure and, accordingly, the accuracy of estimation of the bank angle δ can be increased.

Also, since the angular velocity sensor 55 is so arranged as to incline at the predetermined inclination angle θ about the leftward and rightward axis C2 relative to the forward and rearward axis C1 of the motorcycle, it is possible to calculate the bank angle δ and remove the sensor drift with the single angular velocity sensor 55 and, therefore, the structure can be further simplified.

Also, since the straight forward travel determiner 67 determines the straight forward travelling condition when the condition, in which the estimated roll rate P is lower than the predetermined first determination value J1, continues for the constant length of time t1, and the condition, in which the estimated yaw rate R is lower than the predetermined second determination value J2, continues for the constant length of time t1, the straight forward travelling condition can be easily determined if the estimated yaw rate R and the estimated roll rate P that can be obtained during the process of calculation of the estimated bank angle δ are used in the determination of the straight forward travelling condition.

Also, since the angular velocity corrector 71 includes the suppressing circuit 89 for suppressing the change in correction, it is possible to avoid an abrupt change in the estimated bank angle δ. For example, it is possible to avoid the possibility that the motorcycle rider may have a sense of discomfort when the area illuminated by the lamp changes abruptly.

In addition, the use is made of the process suspending circuit 81 for suspending the calculation of the drift amount D1 during the straight forward travel of the motorcycle by means of the time-of-straight-forward-travel drift amount estimator 69 in the event that after the determination of the straight forward travel of the motorcycle the estimated roll rate P or the estimated yaw rate R exceeds the first determination value J1 or the second determination value J2, respectively, but the calculation can be resumed in the event that the estimated roll rate P or the estimated yaw rate R attains a value lower than the first determination value J1 or the second determination value J2. Accordingly, even though a straight forward travel determining condition is temporarily departed as a result of rocking of the motorcycle due to the wind and/or a road surface condition during the straight forward travel of the motorcycle, the calculation of the time-of-straight-forward-travel drift update amount D1 can be continued once the straight forward travelling condition is resumed subsequently. Therefore, cases of the calculation being incapable, which would occur when the motorcycle rider intentionally rock the motorcycle body considerably can be reduced, allowing the calculation to be performed assuredly.

Moreover, the use is made of the reset circuit 83 for invalidating the calculation of the time-of-straight-forward-travel drift amount D1, performed by the time-of-straight-forward-travel drift amount determiner 69, in the event that such calculation did not terminate within the predetermined length of time t5 subsequent to the determination of the straight forward travelling of the motorcycle. Accordingly, prevention of an erroneous estimation of the drift amount during the instable condition and a useless continuance of the calculation can be avoided when the calculation is aborted if due to, for example, a considerable change in output of the angular velocity sensor 55 such calculation is protracted.

Yet, the use is made of the standstill determiner 73 for determining the standstill condition of the motorcycle from the estimated roll rate P and the standstill time drift amount estimator 75 for estimating the sensor drift update amount D2 during the standstill condition based on the signal ω1, which corresponds to the output ω of the angular velocity sensor 55 from which the estimated drift amount D has been removed, in the event that the standstill determiner 73 determines the standstill condition of the motorcycle, and in addition, the angular velocity corrector 71 corrects the output ω of the angular velocity sensor 55 with the estimated drift amount D, which is calculated based on the sensor drift update amount D2 during the standstill condition. Accordingly, not only the sensor drift occurring during the straight forward travelling of the motorcycle, but also the sensor drift occurring during the halt of the motorcycle can be removed.

Also, since the estimated roll rate inputted to the standstill determiner 73 is calculated from the angular velocity sensor input ω, in which the change in frequency lower than the predetermined frequency has been removed, the roll rate component during the standstill condition can be extracted. Accordingly, since the low frequency change is removed, the man-caused manipulation during the standstill condition can be definitely detected and the standstill condition can therefore be accurately determined.

Figure 10:
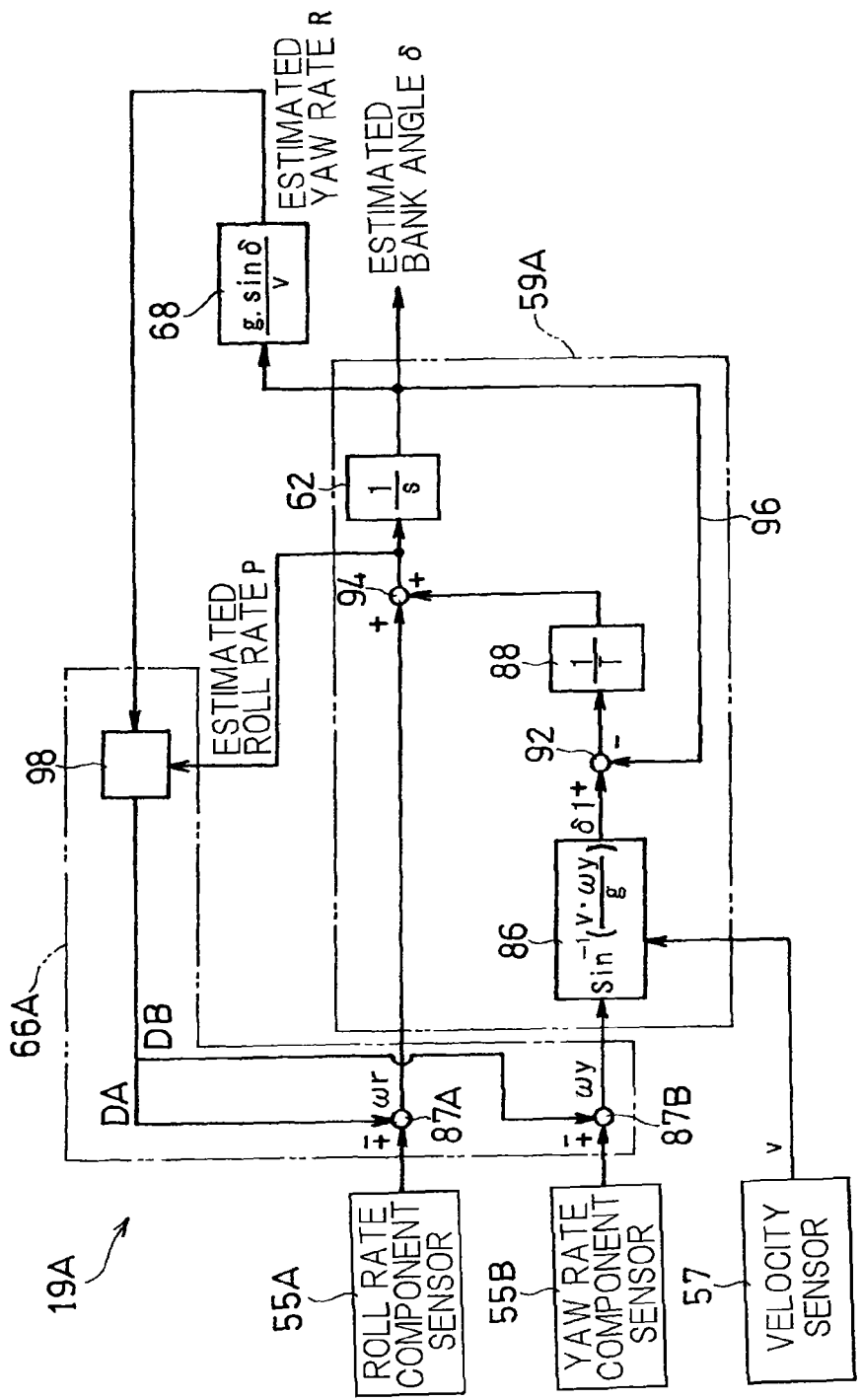
FIG. 10 is a circuit block diagram showing a schematic structure of the bank angle detecting device according to a second preferred embodiment of the present invention.

FIG. 10 illustrates a circuit block diagram showing a schematic structure of the bank angle detecting device 19A designed in accordance with a second preferred embodiment of the present invention. While in the practice of the first embodiment hereinbefore described, the estimated bank angle δ is calculated from the single angular velocity sensor 55 so arranged as to incline as hereinbefore described, the second embodiment shown in FIG. 10 is such that a roll rate component sensor 55A and a yaw rate component sensor 55B are arranged so that the estimated bank angle δ can be calculated based on respective detection values of those sensors 55A and 55B.

The bank angle estimator 59A of the bank angle detecting device 19A according to the second embodiment includes a calibrating bank angle detector 86, a first dividing circuit 88, a third subtracting circuit 92, a second adding circuit 94, an angular velocity integrating circuit 62 and a feedback line 96. The calibrating bank angle detector 86 is operable to calculate a motorcycle body bank angle δ1 for calibration purpose with reference to an output ωy of the yaw component sensor 55B, which output ωy is corrected by a yaw component subtracting circuit 87B as will be described later, and the velocity v of the motorcycle measured by the velocity sensor 57. The third subtracting circuit 92 is operable to generate a difference (δ1−δ) between the body bank angle δ1 for calibration purpose and the estimated bank angle δ outputted from the angular velocity integrating circuit 62 and the first dividing circuit 88 is operable to divide this difference (δ1−δ) by a time T. The second adding circuit 94 is operable to add an output of the first subtracting circuit 88 and an output of the roll rate component sensor 55A together to calculate the estimated roll rate P. In other words, the second adding circuit 94 functions as a roll rate estimator. The angular velocity integrating circuit 62 is operable to integrate the output of the second adding circuit 94 and then to output the estimated bank angle δ. The feedback line 96 is used to feed the output δ of the angular velocity integrating circuit 62 back to a negative input of the third subtracting circuit 92. Accordingly, the value, determined from the output of the roll rate component sensor 55A, is so corrected as to approach the bank angle δ1 for calibration purpose which has been detected by the calibrating bank angle detector 86.

The bank angle detecting device 19A also includes a drift removing circuit 66A and a yaw rate estimator 68 in a manner similar to that according to the previously described first embodiment. This yaw rate estimator 68 calculates the estimated yaw rate R based on the estimated bank angle δ outputted from the angular velocity integrating circuit 62. The drift removing circuit 66A includes a drift amount estimating circuit 98, a roll component subtracting circuit 87A and a yaw component subtracting circuit 87B. This drift amount estimating circuit 98 determines a straightforward or a standstill and then estimates a drift amount, in a manner similar to those in the previously described first embodiment, on the basis of the estimated yaw rate R and the estimated roll rate P outputted from the second adding circuit 94, to thereby obtain respective estimated drift amounts DA and DB of the sensors 55A and 55B. Also, by subtracting the estimated drift amounts DA and DB from the corresponding outputs of the sensors 55A and 55B with the roll component subtracting circuit 87A and the yaw component subtracting circuit 87B, respectively, the sensor drifts occurring in the roll rate component sensor 55A and the yaw rate component sensor 55B can be removed and the sensor outputs are thus corrected.

Figure 11:
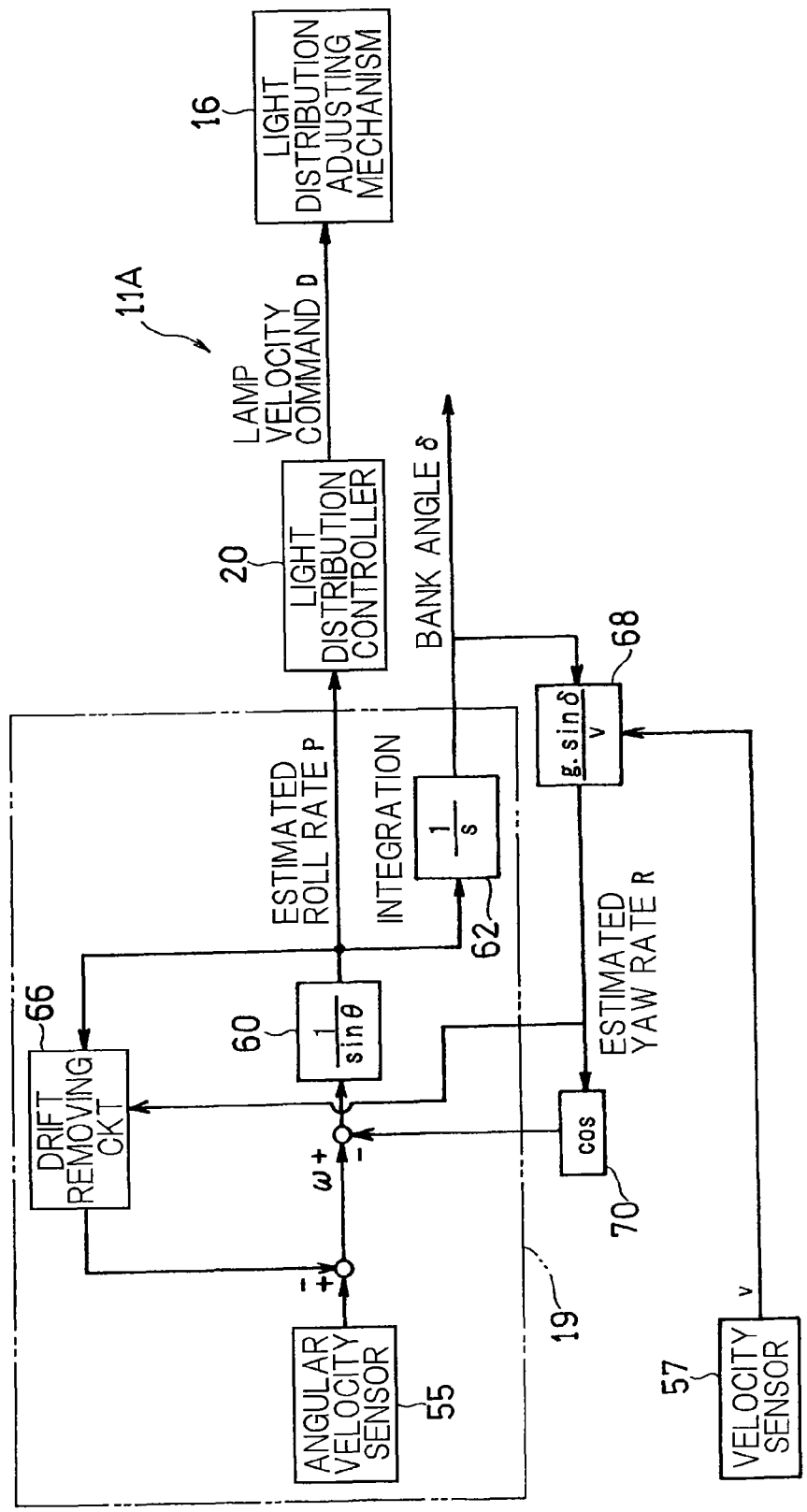
FIG. 11 is a circuit block diagram showing a schematic structure of a third preferred embodiment of the present invention, showing the relation between the estimated bank angle and the lamp angle.

FIG. 11 illustrates a circuit block diagram showing the headlamp device 11A according to a third preferred embodiment of the present invention. According to this third embodiment, the light distribution controller 20 controls the light distribution adjusting mechanism 16 with the estimated roll rate P used as a lamp velocity command D. Based on the angular velocity ω outputted from the angular velocity sensor 55, the roll rate estimating circuit 60 generates an estimated roll rate P, which is in turn outputted to the angular velocity integrating circuit 62. The angular velocity integrating circuit 62 performs a time integration of the estimated roll rate P to calculate the estimated bank angle δ. The bank angle δ so obtained is used in any suitable application such as, for example, a circuit for restricting an engine torque by, for example, an excessive bank angle as will be described later.

According to the first embodiment shown in and described with particular reference to FIG. 9, in order to retain the balance between the follow-up characteristic and the resistance to noises, not only is the tuning of the control gain of the light distribution controller 20 required, but also the lamp angle α is delayed relative to the estimated bank angle δ. In contrast thereto, according to the third embodiment shown in FIG. 11, the lamp velocity command D and the estimated roll rate P coincide with each other and, therefore, not only is the lamp angle α not delayed relative to the estimated bank angle δ, but also the tuning is no longer required.

Figure 12:
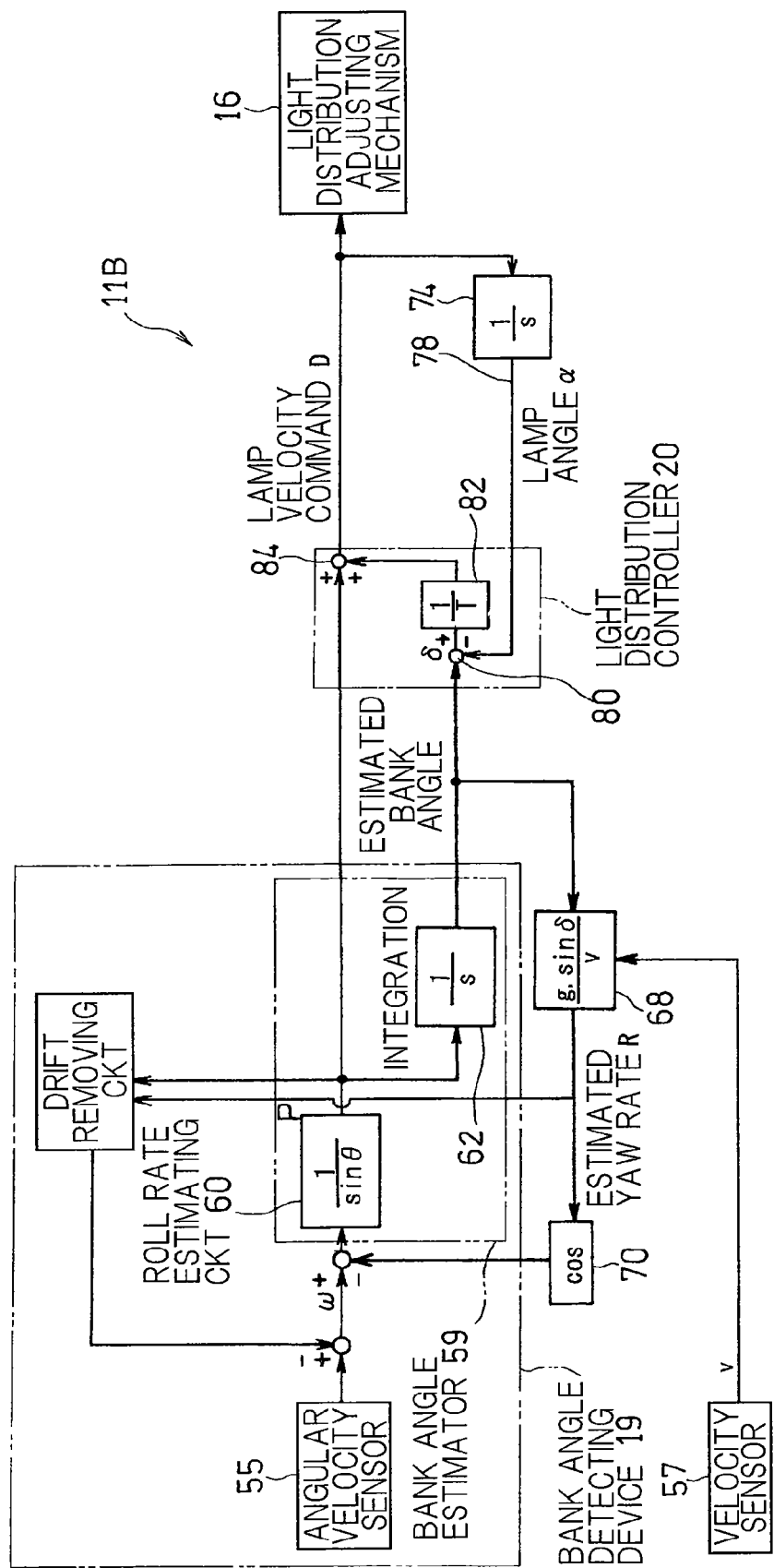
FIG. 12 is a circuit block diagram showing a schematic structure of a fourth preferred embodiment of the present invention, showing the relation between the estimated bank angle and the lamp angle.

FIG. 12 illustrates a circuit block diagram of the headlamp device 11B designed in accordance with a fourth preferred embodiment of the present invention. According to this fourth embodiment, in addition to the previously described third embodiment, the light distribution controller 20 includes a second subtracting circuit 80 for determining a difference between the estimated bank angle δ and the lamp angle α, a second dividing circuit 82 for dividing the output of the second subtracting circuit 80 by a predetermined time preset value, and a third adding circuit 84 for adding the output of the second dividing circuit 82 to the estimated roll rate P to generate a lamp velocity command signal D.

The second subtracting circuit 80 generates a difference (δ−α) between the estimated bank angle δ, outputted from the angular velocity integrating circuit 62, and the lamp angle α outputted from the lamp velocity integrating circuit 74 and the second dividing circuit 82 divides this difference (δ−α) by the time T. The third adding circuit 84 is operable to add the output of the second dividing circuit 82 and the output of the roll rate estimating circuit 60 together. The lamp velocity integrating circuit 74 integrates an output of the third adding circuit 84 and then outputs the lamp angle α. The feedback line 78 is used to feed the output a of the lamp velocity integrating circuit 74 back to a negative input of the second subtracting circuit 80.

According to the previously described first embodiment the lamp angle α can definitely follow up the estimated bank angle δ, but the lamp angle α is somewhat delayed relative to the estimated bank angle δ as hereinbefore described. On the other hand, however, according to the third embodiment shown in and described with particular reference to FIG. 11, the delay of the lamp angle α relative to the estimated bank angle δ can be improved, but there is no warranty that in the light distribution adjusting mechanism 16 the lamp angle α can be coincided with the estimated bank angle δ in the event that a control deviation occurs in the actual lamp velocity relative to the lamp command velocity D.

In contrast thereto, the fourth embodiment shown in FIG. 12 includes both of respective constructions according to the previously described first and third embodiments and, therefore, the follow-up characteristic and the response can be made consistent with each other when the preset time T is properly chosen. The output of the second subtracting circuit 80 in the circuit of FIG. 12 is equivalent to the output of the first subtracting circuit 76 employed in the circuit shown in FIG. 9. In other words, the lamp velocity command D in the circuit of FIG. 12 can be obtained by adding to the estimated roll rate P in the circuit of FIG. 11, the quotient of the lamp angle control deviation δ1 in the circuit of FIG. 9 divided by the time T. Accordingly, by properly choosing the time T, the follow-up characteristic exhibited in the practice of the previously described first embodiment and the response exhibited in the practice of the previously described third embodiment can be made consistent with each other.

In other words, if the time T is chosen to be short, the output of the difference δ−α that is divided in the second dividing circuit 82 by the time T becomes large, thus approaching the first embodiment shown in and described with reference to FIG. 9. On the other hand, if the time T is chosen to be long, the output of the difference δ−α that is divided by the time T becomes small, thus approaching to the third embodiment shown in and described with reference to FIG. 11. The preset time T is preferably chosen to be within the range of 0.5 to 5 seconds and, more preferably, within the range of 1 to 2 seconds. It is to be noted that even in the fourth embodiment shown in FIG. 12, the lamp angle α may be delivered from the amount of rotation of the driver 18 detected by the encoder 29.

With the present invention having been fully described above, the bank angle detecting device of the present invention can be applied not only to the headlamp device for the motorcycle, but also to any of the following applications. For example, it can be applied to the application in which, for example, since a vehicle tire is apt to slip if the bank angle is large during the travel of the motorcycle, the engine torque can be limited in dependence on the magnitude of the detected bank angle in order to avoid the slippage of the tire. It can also be applied to the application in which, while the bank angle during the travel is stored in a drive recorder as data, driving particulars may be examined with reference to such data or such data may be utilized for future's driving. Yet, it can be applied to the application in which when the bank angle increases while the road surface is so wet under the rainy weather enough to cause the vehicle to slip, a warning can be issued to call the rider's attention.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in the embodiment of the present invention hereinbefore fully described, reference has been made to the motorcycle, the bank angle detecting device of the present invention can be equally employed in various vehicles in general that can be turned with the body banked (tilted), such as, for example, a scooter or any other vehicle of a kind a driver can maneuver while straddling over it and including, for example, a small size planing boat.

Also, in describing the preferred embodiment of the present invention hereinbefore, only one angular velocity sensor 55 has been shown and described as used and arranged in an inclined fashion, two or more angular velocity sensors may be employed.

Accordingly, such changes and modifications are, unless they depart from the scope of the present invention as delivered from the claims annexed hereto, to be construed as included therein.

REFERENCE NUMERALS

19 . . . Bank angle detecting device
55 . . . Angular velocity sensor
57 . . . Velocity sensor
59, 59A . . . Bank angle estimator
60, 94 . . . Roll rate estimating circuit
64 . . . Feedback circuit
66 . . . Drift removing circuit
67 . . . Straight forward travel determiner
68 . . . Yaw rate estimator
69 . . . Time-of-straight-forward-travel drift amount determiner
71 . . . Angular velocity corrector
73 . . . Standstill determiner
75 . . . Standstill time drift amount estimator
81 . . . Process suspending circuit
83 . . . Reset circuit
89 . . . Suppressing circuit
D1 . . . Time-of-straight-forward-travel drift update amount
D2 . . . Standstill time drift update amount
P . . . Estimated roll rate
R . . . Estimated yaw rate (Value associated with the estimated bank angle)
V . . . Velocity
δ . . . Estimated bank angle (Value associated with the estimated bank angle)
ω . . . Angular velocity
θ . . . Angle of inclination

What is claimed is:

1. A bank angle detecting device for a vehicle, which comprises:
   an angular velocity sensor for acquiring a detection value containing respective component of a roll rate, which is an angular velocity about a forward and rearward axis of the vehicle, and a yaw rate, which is an angular velocity about a vertical axis of the vehicle;
   a roll rate estimator for calculating an estimated roll rate on the basis of the detection value of the angular velocity and a travelling speed of the vehicle;
   a bank angle estimator for calculating an estimated bank angle of the vehicle from the estimated roll rate;
   a yaw rate estimator for calculating an estimated yaw rate on the basis of the estimated bank angle and the travelling speed;
   a straight forward travel determiner for determining a straight forward travelling condition of the vehicle during the travel of the vehicle on the basis of the estimated roll rate and the estimated yaw rate;
   a time-of-straight-forward-travel drift amount estimator for determining an output of the angular velocity sensor as a sensor drift amount during the straight forward travel of the vehicle in the event that the straight forward travel determiner determines the straight forward travelling condition; and
   an angular velocity corrector for correcting the output of the angular velocity sensor so that the sensor drift amount estimated by the time-of-straight-forward-travel drift amount estimator is subtracted from the output of the angular velocity sensor,
   wherein the straight forward travel determiner determines the straight forward travelling condition in the event that a condition, in which the estimated roll rate is lower than a first predetermined determination value, continues for a first predetermined length of time and, also, a condition, in which the estimated yaw rate is lower than a second predetermined determination value, continues for a second predetermined length of time.

2. The bank angle detecting device for the vehicle as claimed in claim 1, in which the angular velocity sensor is so arranged as to incline at a predetermined angle of inclination about a leftward and rightward axis relative to the forward and rearward axis of the vehicle.

3. The bank angle detecting device for the vehicle as claimed in claim 1, in which the angular velocity corrector comprises a suppressing circuit for suppressing a change in amount of correction.

4. The bank angle detecting device for the vehicle as claimed in claim 1, further comprising a process suspending circuit operable to suspend the calculation of the drift amount during the straight forward travel, which is performed by the time-of-straight-forward-travel drift amount estimator, in the event that subsequent to determination of the straight forward travelling condition the estimated roll rate and the estimated yaw rate exceed respective predetermined values, but to resume such calculation in the event that they attain respective values lower than the predetermined values.

5. The bank angle detecting device for the vehicle as claimed in claim 4, further comprising a reset circuit operable to invalidate a calculation of the drift amount during the straight forward travel, which is performed by the time-of-straight-forward-travel drift amount estimator, in the event that such calculation fails to terminate within a predetermined length of time subsequent to the determination of the straight forward travelling condition.

6. The bank angle detecting device for the vehicle as claimed in claim 1, further comprising a standstill determiner for determining a standstill condition of the vehicle and a standstill time drift amount estimator for estimating a sensor drift amount from an output of the angular velocity sensor in the event that the standstill time determiner determines the standstill condition, and
    wherein the angular velocity corrector corrects the output of the angular velocity sensor with the sensor drift amount estimated during the standstill condition.

7. The bank angle detecting device for the vehicle as claimed in claim 6, in which the estimated roll rate inputted to the standstill determiner is the one from which a change in frequency lower than a predetermined frequency is removed.

8. The bank angle detecting device for the vehicle as claimed in claim 1, wherein the time-of-straight-forward-travel drift amount estimator includes an averaging circuit for averaging a signal corresponding to the output of the angular velocity sensor, from which the estimate drift amount has been removed, for a predetermined length of time in the event that the straight forward traveling condition is determined by the straight forward travel determiner.

9. The bank angle detecting device for the vehicle as claimed in claim 8, wherein the time-of-straight-forward-travel drift amount estimator estimates the sensor drift amount during the straight forward travel of the vehicle by averaging the output of the angular velocity sensor in the event that the straight forward traveling condition is determined by the straight forward travel determiner.

10. A motorcycle equipped with the bank angle detecting device as defined in claim 1.

11. A bank angle detecting method for a vehicle, which comprises:
    a detecting step of acquiring a detection value containing roll rate and yaw rate components of the vehicle, by means of an angular velocity sensor;
    a roll rate estimating step for calculating an estimated roll rate, which is an angular velocity about a forward and rearward axis, on the basis of the detection value, detected during the detecting step, and a travelling speed of the vehicle;
    a bank angle estimating step of calculating an estimated bank angle of the vehicle from the estimated roll rate;
    a yaw rate estimating step of calculating an estimated yaw rate on the basis of the estimated bank angle and the travelling speed;
    a straight forward travel determining step of determining a straight forward travelling condition of the vehicle during the travel of the vehicle on the basis of the estimated roll rate and a value associated with the estimated bank angle;
    a time-of-straight-forward-travel drift amount estimating step of determining an output of the angular velocity sensor as a sensor drift amount during the straight forward travel of the vehicle in the event that in the straight forward travel step the straight forward travelling condition is determined; and
    an angular velocity correcting step of correcting the output of the angular velocity sensor so that the sensor drift amount estimated in the time-of-straight-forward-travel drift amount estimating step is subtracted from the output of the angular velocity sensor,
    wherein in the straight forward travel determining step, the straight forward travel determiner determines the straight forward traveling condition in the event that a condition, in which the estimated roll rate is lower than a first predetermined determination value, continues for a first predetermined length of time and, also, a condition, in which the estimated yaw rate is lower than a second predetermined determination value, continues for a second predetermined length of time.

12. A bank angle detecting device for a vehicle, which comprises:
    an angular velocity sensor for acquiring a detection value containing respective component of a roll rate, which is an angular velocity about a forward and rearward axis of the vehicle, and a yaw rate, which is an angular velocity about a vertical axis of the vehicle;
    a roll rate estimator for calculating an estimated roll rate on the basis of the detection value of the angular velocity and a traveling speed of the vehicle;
    a bank angle estimator for calculating an estimated bank angle of the vehicle from the estimated roll rate;
    a yaw rate estimator for calculating an estimated yaw rate on the basis of the estimated bank angle and the travelling speed;
    a straight forward travel determiner for determining a straight forward traveling condition of the vehicle during the travel of the vehicle on the basis of the estimated roll rate and the estimated yaw rate;
    a time-of-straight-forward-travel drift amount estimator for estimating a sensor drift amount during the straight forward travel of the vehicle from an output of the angular velocity sensor in the event that the straight forward travel determiner determines the straight forward traveling condition; and
    an angular velocity corrector for correcting the output of the angular velocity sensor with the sensor drift amount estimated by the time-of-straight-forward-travel drift amount estimator,
    wherein the straight forward travel determiner determines that the motorcycle body is traveling straight forward or turning based on the estimated roll rate, and determines that the motorcycle body is traveling straight forward based on the estimated yaw rate.

* * * * *